United States Patent
Hamamoto et al.

(10) Patent No.: US 9,176,777 B2
(45) Date of Patent: Nov. 3, 2015

(54) SYSTEM FOR DETERMINING OPERATING TIME OF A COMPUTER TO EXECUTE ASSIGNED TASKS BASED ON AN AMOUNT OF CHANGE PER UNIT TIME OF A STORED ELECTRIC POWER

(75) Inventors: Masaki Hamamoto, Kokubunji (JP); Junichi Miyakoshi, Kokubunji (JP); Takashi Takeuchi, Kokubunji (JP)

(73) Assignee: Hitachi, Ltd., Tokyo (JP)

(*) Notice: Subject to any disclaimer, the term of this patent is extended or adjusted under 35 U.S.C. 154(b) by 494 days.

(21) Appl. No.: 13/532,038

(22) Filed: Jun. 25, 2012

(65) Prior Publication Data
US 2013/0061073 A1    Mar. 7, 2013

(30) Foreign Application Priority Data
Sep. 5, 2011    (JP) .................. 2011-192550

(51) Int. Cl.
G06F 1/26    (2006.01)
G06F 1/32    (2006.01)
G06F 9/48    (2006.01)
H04W 52/02    (2009.01)

(52) U.S. Cl.
CPC ............ *G06F 9/4893* (2013.01); *G06F 1/3209* (2013.01); *H04W 52/0277* (2013.01); *Y02B 60/144* (2013.01)

(58) Field of Classification Search
CPC ......... H02J 3/383; H02J 7/0008; H02J 7/042; H02J 7/244; H04W 52/0277
USPC .......................................................... 713/320
See application file for complete search history.

(56) References Cited

U.S. PATENT DOCUMENTS

| | | | |
|---|---|---|---|
| 2005/0066208 A1* | 3/2005 | Koie et al. | 713/320 |
| 2007/0226527 A1* | 9/2007 | Ang | 713/320 |
| 2009/0102601 A1* | 4/2009 | Mathiesen et al. | 340/3.1 |
| 2011/0029440 A1* | 2/2011 | Motoyama et al. | 705/301 |
| 2011/0080422 A1* | 4/2011 | Lee et al. | 345/589 |
| 2012/0005489 A9* | 1/2012 | Allgaier et al. | 713/300 |

FOREIGN PATENT DOCUMENTS

| | | |
|---|---|---|
| JP | 2010-263349 A | 11/2010 |
| JP | 2011-103726 A | 5/2011 |

* cited by examiner

*Primary Examiner* — Jaweed A Abbaszadeh
*Assistant Examiner* — Xuxing Chen
(74) *Attorney, Agent, or Firm* — Mattingly & Malur, PC

(57) ABSTRACT

Disclosed herein is a computer system including multiple worker nodes, each being equipped with an electric power generation unit and an electric power storage unit storing electric power generated by the electric power generation unit, and a master node responsible for management of tasks that are assigned to the worker nodes. Each worker node determines an operating cycle time of the worker node to execute a task assigned by the master node or communicate with any other worker node, based on information indicating a change in electric power stored in the electric power storage unit of the worker node.

13 Claims, 24 Drawing Sheets

| VALUE OF GRADIENT a | OPERATING CYCLE TIME Tb |
|---|---|
| ... | ... |
| 1.2 > a ≥ 0.6 | 2Tm |
| 2.4 > a ≥ 1.2 | Tm |
| 4.8 > a ≥ 2.4 | Tm/2 |
| 9.6 > a ≥ 4.8 | Tm/4 |
| ... | ... |

| VALUE OF CHARGING TIME Tchg | OPERATING CYCLE TIME Tb |
|---|---|
| ... | ... |
| 0.6 > Tchg ≥ 0.3 | Tm/4 |
| 1.2 > Tchg ≥ 0.6 | Tm/2 |
| 2.4 > Tchg ≥ 1.2 | Tm |
| 4.8 > Tchg ≥ 2.4 | 2Tm |
| ... | ... |

SYSTEM FOR DETERMINING OPERATING TIME OF A COMPUTER TO EXECUTE ASSIGNED TASKS BASED ON AN AMOUNT OF CHANGE PER UNIT TIME OF A STORED ELECTRIC POWER

CLAIM OF PRIORITY

The present application claims priority from Japanese patent application JP 2011-192550 filed on Sep. 5, 2011, the content of which is hereby incorporated by reference into this application.

FIELD OF THE INVENTION

The present invention relates to a computer system that performs distributed information processing and, in particular, to a computer system with multiple computers (nodes), each being equipped with an electric power generation unit and an electric power storage unit.

BACKGROUND OF THE INVENTION

With the development of semiconductor technology, computers have become able to operate with increasing lower power consumption. Under such circumstances, in the field of sensor networks, a small computer (a computer node, hereinafter referred to as a "node") that operates making use of natural energy is known (see Japanese Unexamined Patent Application Publication No. 2011-103726 which is hereinafter referred to as Patent Document 1).

Meanwhile, in the field of distributed information processing, realizing the operation of each node making use of natural energy only is beneficial, since it can lead to a reduction in environmental load. Here, communication between nodes is a bottleneck in distributed information processing and it is desirable that a communication rate (communication bandwidth) between nodes is as large as possible. Thus, a technique for setting a suitable communication rate based on the remaining amount of power (the remaining amount of battery power) is known (see Japanese Unexamined Patent Application Publication No. 2010-263349 which is hereinafter referred to as Patent Document 2).

SUMMARY OF THE INVENTION

By the way, in a case where natural energy is used, it is beneficial if the output of an electric power generation unit of each node is smaller, because the node can be made smaller with reduced cost and it can be used in a broader application area. Moreover, it is beneficial if the capacity of an electric power storage unit of each node is smaller, because an electric dual layer capacitor, condenser, or the like having a longer life can be used instead of a secondary battery based on chemical reaction such as a lead battery, resulting in no need for maintenance such as battery replacement.

Here, in the method of setting a communication rate based on the remaining amount of power, like the technique disclosed in Patent Document 2, good communication rate control is possible if the electric power storage unit has a sufficiently large capacity. However, there was a problem in which a stable and suitable control of communication rate is not possible for a node having a small-capacity electric power storage unit. This is due to the following two reasons.

First, the communication rate control according to the remaining amount of power is such that, if the remaining amount of power is, for example, twice as large as a predetermined reference value of the remaining amount, the communication rate is set to be twice as large as a predetermined reference value of rate. That is, a maximum breadth of communication rate that can be controlled is determined depending on how large the capacity of the electric power storage unit is. Therefore, if the electric power storage unit has a small capacity, the breadth of communication rate control is not allowed to be large.

Second, because of the small capacity of the electric power storage unit, there is a large amount of change in the remaining amount of power with respect to the capacity of the electric power storage unit (i.e., the remaining amount of power that is 100%. Therefore, a communication rate does not stabilize and communication between nodes does not operate well.

The present invention takes the above-noted problem into consideration and is intended to provide a computer system that enables a stable and suitable communication rate control even for a node having a small-capacity electric power storage unit.

To address the above program, a framework, for example, as described in the attached claims may be adopted.

The present application includes multiple means for solving the above problem. As one example of such means, there is provided a computer system comprising multiple worker nodes, each being equipped with an electric power generation unit and an electric power storage unit storing electric power generated by the electric power generation unit, and a master node responsible for management of tasks that are assigned to the worker nodes. Each of the worker nodes determines an operating cycle time of the worker node to execute a task assigned by the master node or communicate with any other worker node, based on information indicating a change in electric power stored in the electric power storage unit of the worker node.

According to the present invention, a stable and suitable communication rate control is possible even for a node having a small-capacity electric power storage unit.

Problems other than the above-noted problem, configurations, and advantageous effects will be clarified from the following description of embodiments.

DETAILED DESCRIPTION OF THE PREFERRED EMBODIMENTS

Embodiments of the present invention will be described below with reference to the drawings.

First Embodiment

In a first embodiment, a facility that carries out distributed information processing by utilizing nodes is described by way of example. All these nodes are equipped with a small-output electric power generation unit that converts natural energy such as solar energy into electric power and a small-capacity electric power storage such as a capacitor or condenser.

System Architecture

Figure 1:
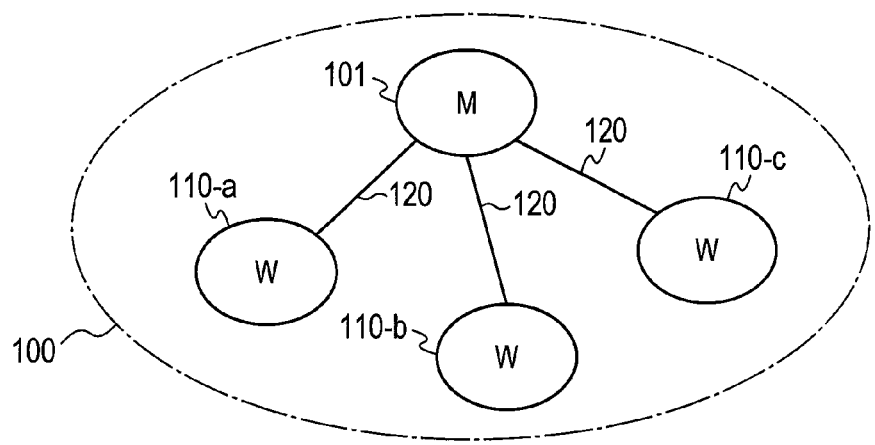
FIG. 1 is a diagram showing an example of overall architecture of a distributed information processing facility of a first embodiment of the present invention.

FIG. 1 is a diagram showing an example of overall architecture of a distributed information processing facility 100 of the first embodiment of the present invention. The distributed information processing facility 100 shown in FIG. 1 is a calculation system model based on a general worker-master scheme.

The distributed information processing facility 100 includes a master node 101 and multiple worker nodes 110-$a$, 110-$b$, 110-$c$. The mater node 101 and each worker node 110-$a$ to 110-$c$ are connected via a network 120. In the following description, the network 120 is assumed as a wireless network.

The master node 101 mainly manages tasks that are assigned to each worker node 110-$a$ to 110-$c$. The master node 101 serves as a node that exercises control over the entire system.

The worker nodes 110-$a$ to 110-$c$ (hereinafter simply referred to as "worker nodes 110") process tasks assigned to them by the master node 101. Each of these worker nodes 110 has the same configuration.

Figure 2:
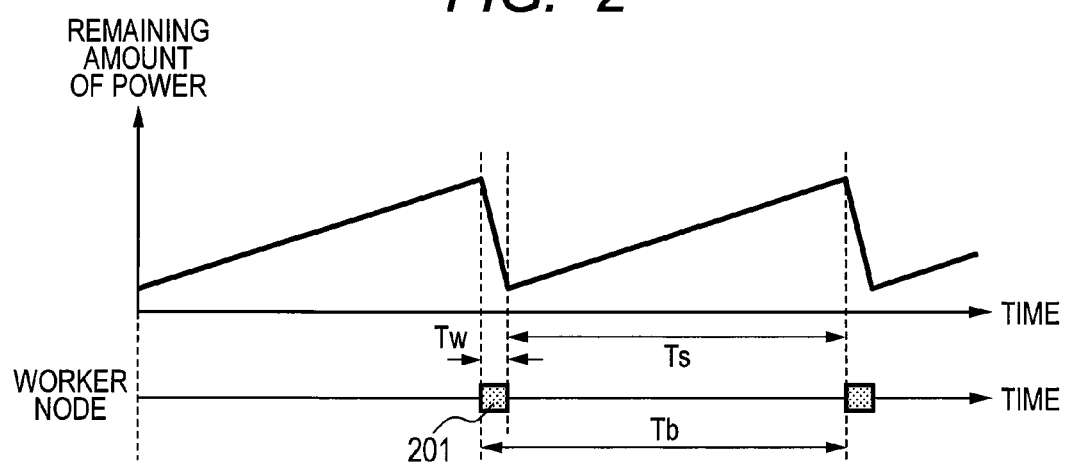
FIG. 2 is a diagram illustrating an example of basic operation of worker nodes in the first embodiment of the first invention.

FIG. 2 is a diagram illustrating an example of basic operation of the worker nodes 110 in the first embodiment of the first invention.

Each worker node 110 operates periodically on an operating cycle time Tb consisting of a sleep period Ts and a wakeup period Tw. During a sleep period Ts, the worker node 110 stops a processing operation 201, generates electric power utilizing natural energy, and stores the electric power. On the other hand, during a wakeup period Tw, the worker node 110 executes a processing operation 201 for communication and calculation processing and consumes the electric power stored during a sleep period Ts.

In the distributed information processing facility 100 of the first embodiment of the present invention, the amount of electric power stored during a sleep period Ts is, for example, in the order of several hundred microwatt-second. A sleep period Ts and a wakeup period Tw are in the order of several hundred milliseconds and several milliseconds, respectively.

Electric power consumed by a processing operation 201 for a wakeup period Tw is, for example, in the order of several tens of milliwatts (mW). However, these values are not limited to those mentioned here.

Node Configurations

The configurations of the master node 101 and each worker node 110 in the first embodiment of the present invention are now described in detail.

Master Node Configuration

Figure 3:
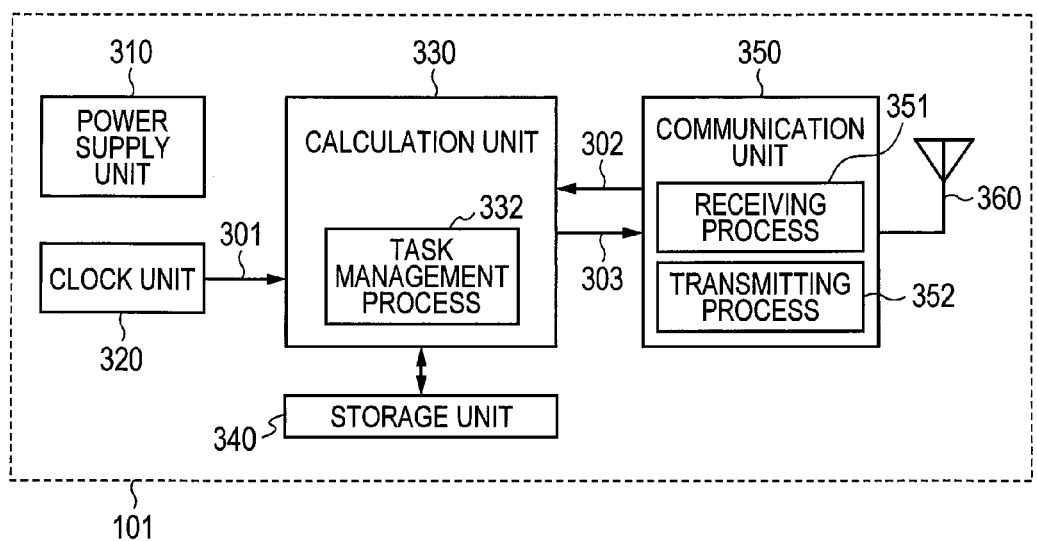
FIG. 3 is a diagram showing an example of a configuration of a master node in the first embodiment of the present invention.

FIG. 3 is a diagram showing an example of a configuration of the master node 101 in the first embodiment of the present invention. The master node 101 includes a power supply unit 310, a clock unit 320, a calculation unit 330, a storage unit 340, a communication unit 350, and an antenna unit 360.

The power supply unit 310 is a stale power supply using utility power or a battery or the like and supplies power to the master node 101.

The clock unit 320 is a module for providing clock time information 301 to the calculation unit 330. The clock time information 301 may be global clock time information obtained by means of an atomic clock or the like or local clock time information obtained by means of a counter or the like.

The calculation unit 330 is a module for executing a calculation program and is generally configured with a CPU (Central Processing Unit). This calculation unit 330 carries out a task management process 332. The task management process 332 is to manage tasks which are to be assigned and which have already been assigned to the worker nodes 110.

The storage unit 340 is a memory or a module called storage for storing data. Various sorts of information which are stored in the storage unit 340 will be described later using FIG. 4.

The communication unit 350 is a module that carries out communication processing (a receiving process 351 and a transmitting process 352) for communicating with a worker node 110. Data received by the receiving process 351 is transferred to the calculation unit 330 as received data 302. Data to be transmitted by the transmitting process 352 is transferred to the communication unit 350 as transmission data 303.

The antenna unit 360 is a module for inputting and outputting radio waves.

Figure 4:
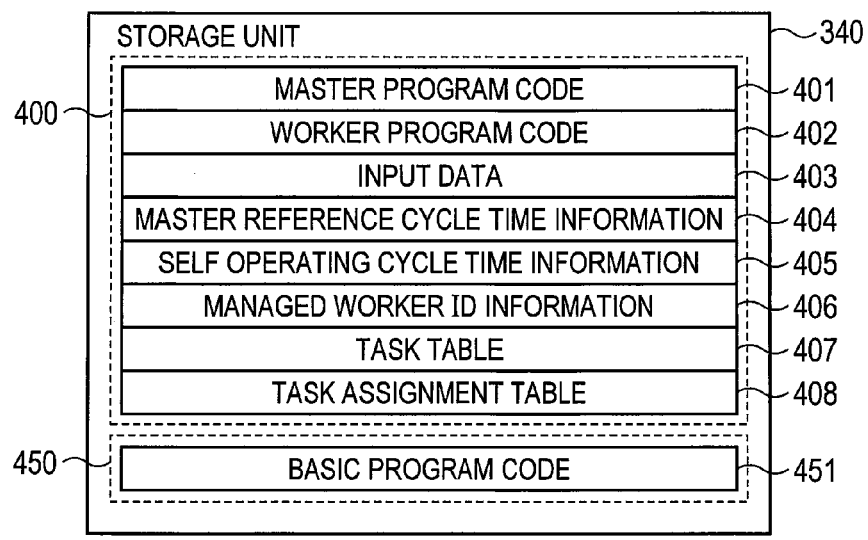
FIG. 4 is a diagram illustrating what information is stored in a storage unit of the master node 101 in the first embodiment of the present invention.

FIG. 4 is a diagram illustrating what information is stored in the storage unit 340 of the master node 101 in the first embodiment of the present invention. The storage unit 340 has a RAM (Random Access Memory) part 400 and a ROM (Read Only Memory) part 450.

In the RAM part 400, master program code 401, worker program code 402, input data 403, master reference cycle time information 404, self operating cycle time information 405, managed worker ID information 406, a task table 407, and a task assignment table 408 are stored.

In the ROM part 450, basic program code 451 is stored.

The master program code 401 is an execution program for the master node 101. The worker program code 402 is an execution program for a worker node 110 and is transmitted to the worker node 110. The input data 403 is input data to be processed by a worker node 110.

The master reference cycle time information 404 represents a reference cycle time for getting timing for communication (establishing synchronization) with each worker node 110. The self operating cycle time information 405 represents a cycle time, based on which the master node 101 itself executes an operation such as communication processing. The master node 101 intermittently repeats a processing operation and a sleep operation based on the clock time information 301 and the self operating cycle time information 405.

The managed worker ID information 406 is ID (identifier) information for each of the worker nodes 110 managed by the master node 101 and is referred to when the master node is to communicate with each worker node 110 or when the master node is to assign a task thereto.

The task table 407 stores information related to tasks to be processed. The information related to tasks to be processed involves a list of tasks to be processed in the distributed information processing facility 100, indication as to whether each task has finished, the size of each task, dependency between tasks (a sequence in which the tasks should be processed), etc.

The task assignment table 408 stores information related to assignment of each task, such as information indicating, for each task stored in the task table 407, a worker node 110 to which the task was assigned and the task processing state.

The basic program code 451 is read when the master node 101 is booted to perform various initial settings and the like.

Worker Node Configuration

Figure 5:
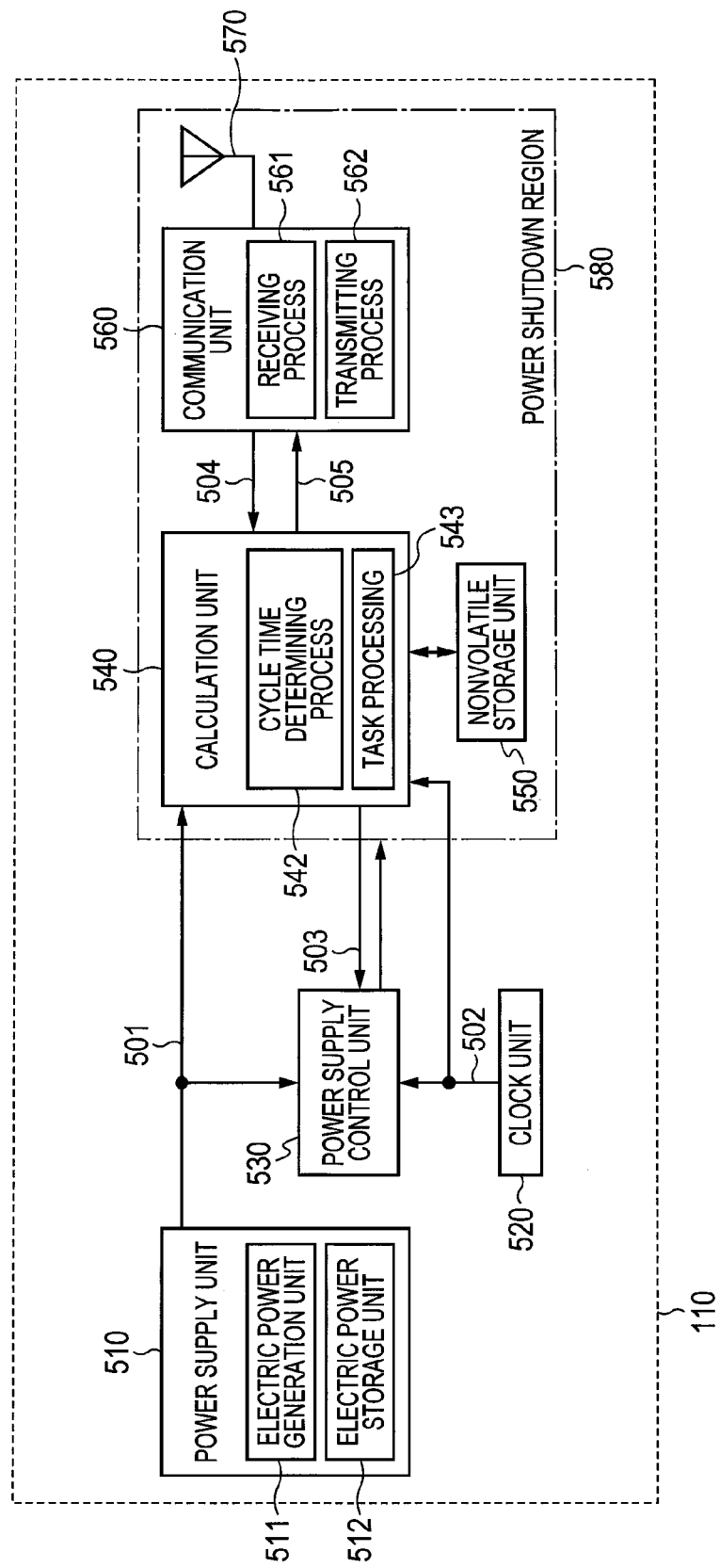
FIG. 5 is a diagram showing an example of a configuration of a worker node in the first embodiment of the present invention.

FIG. 5 is a diagram showing an example of a configuration of a worker node 110 in the first embodiment of the present invention. The worker node 110 includes a power supply unit 510, a clock unit 520, a power supply control unit 530, calculation unit 540, a nonvolatile storage unit 550, a communication unit 560, and an antenna unit 570.

The power supply unit 510 is a module that supplies power for the worker node 110 to operate and includes an electric power generation unit 511 and an electric power storage unit 512. The electric power generation unit 511 is a module that converts natural energy such as solar energy and vibration energy into electric power and it is, for example, a solar panel or the like. The electric power storage unit 512 is a module that stores electric power made available by the electric power generation unit 511. Information for how much power has been stored in the electric power storage unit 512 is provided to the power supply control unit 530 and the calculation unit 540 as remaining amount of power information 501. The electric power storage unit 512 is, for example, an electric dual layer capacitor, condenser, or the like. In other words, the power supply unit 510 includes a small-size and small-output electric power generation unit 511 and a small-capacity electric power storage unit 512.

The clock unit 520 is a module for providing clock time information 502 to the power supply control unit 530 and the calculation unit 540. The clock time information 502 may be local clock time information obtained by means of a counter or the like in the worker node 110.

The power supply control unit 530 includes a wakeup time setting register in which a time to start a wakeup period Tw is set and is a module that performs switching on/off of the power supply to a power shutdown region 580 based on the remaining amount of power information 501, clock time information 502, and control information 503.

The calculation unit 540 is a module for executing a calculation program and is generally configured with a CPU. This calculation unit 540 carries out a cycle time determining process 542 and task processing 543. The cycle time determining process (operating cycle time determining means) 542 determines an operating cycle time (communication rate) Tb of the worker node 101 based on a power generation status index (which is here an amount of change per unit time in the remaining amount of power of the electric power storage unit 512). Details hereof will be described later. The task processing 543 is to execute a task assigned by the master node 101. In particular, the task processing is to read data (a micro task)

for which calculation is in process from the nonvolatile storage unit 550 and write calculation result data into the nonvolatile storage unit 550.

When the worker node 110 performs an intermittent operation on the operating cycle time Tb as illustrated in FIG. 2, if the remaining amount of power becomes zero during a wakeup period Tw, this state might result in corruption of data for which calculation is in process. Thus, for the worker node 110 in the first embodiment of the present invention, a single task assigned by the master node 101 is subdivided into one or more smaller processing units (micro tasks) and task processing is carried out in units of micro tasks. The amount of power required to execute a single micro task is defined as a minimum operating power quantity Eth1. The control information 503 includes information for the minimum operating power quantity Eth1, information for the operating cycle time Tb, and operation finished information. The operation finished information indicates that a processing operation being executed by the calculation unit 540 during a wakeup period Tw has finished.

The nonvolatile storage unit 550 is a module that is capable of retaining data even when the power supply is off and it is, for example, ROM, FeRAM (Ferroelectric Random Access Memory), flash memory, or the like. Various sorts of information which are stored in the nonvolatile storage unit 550 will be described later using FIG. 4.

The communication unit 560 is a module that carries out communication processing (a receiving process 561 and a transmitting process 561) for communicating with some other node such as the master node 101 and any other worker node 110. Data received by the receiving process 561 is transferred to the calculation unit 540 as received data 504. Data to be transmitted by the transmitting process 562 is transferred to the communication unit 560 as transmission data 505.

The antenna unit 570 is a module for inputting and outputting radio waves.

Figure 6:
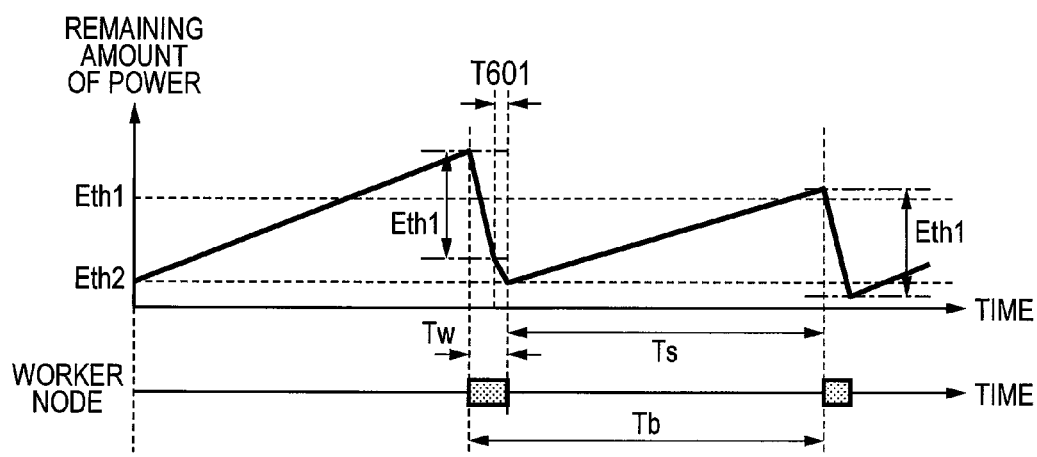
FIG. 6 is a diagram illustrating an example of operation of a worker node in the first embodiment of the present invention.

FIG. 6 is a diagram illustrating an example of operation of a worker node 110 in the first embodiment of the present invention.

As illustrated in FIG. 6, each worker node 110 operates periodically on an operating cycle time Tb consisting of a sleep period Ts and a wakeup period Tw. Here, each time the operating cycle time Tb has elapsed, the worker node 110 (the power supply control unit 530 in FIG. 5) decides whether the remaining amount of power is larger than the minimum operating power quantity Eth1. Only if the remaining amount of power is larger than the minimum operating power quantity Eth1, the power supply control unit 530 turns on the power supply to the power shutdown region 580 and the worker node transits into a wakeup period Tw. Subsequently, when the power supply control unit 530 receives from the calculation unit 540 an operation finished signal indicating that a processing operation has finished, it turns off the power supply to the power shutdown region 580 and the worker node transits into a sleep period Ts.

As noted above, the worker node 110 is able to transit from a sleep period Ts into a wakeup period Tw, only if the remaining amount of power is larger than the minimum operating power quantity Eth1. Thereby, it is possible to prevent corruption of data for which calculation is in process. Description about a sleep baseline power quantity Eth2 will be provided later, using FIG. 8.

Figure 7:
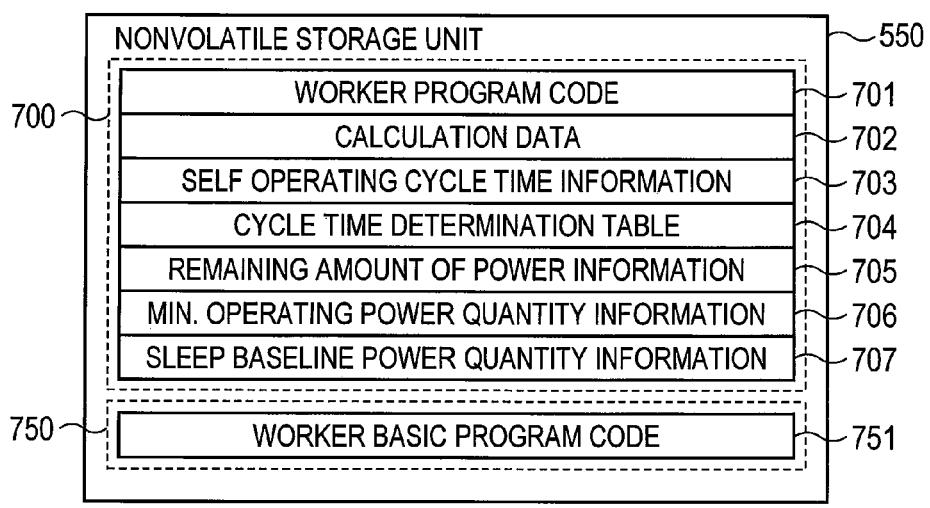
FIG. 7 is a diagram illustrating what information is stored in a nonvolatile storage unit of a worker node in the first embodiment of the present invention.

FIG. 7 is a diagram illustrating what information is stored in the nonvolatile storage unit 550 of a worker node 110 in the first embodiment of the present invention. The nonvolatile storage unit 550 has a RAM part 700 and a ROM part 750.

In the RAM part 700, worker program code 701, calculation data 702, self operating cycle time information 703, a cycle time determination table 704, remaining amount of power information 705, minimum operating power quantity information 706, and sleep baseline power quantity information 707 are stored.

In the ROM part 750, worker basic program code 751 is stored.

The worker program code 701 is an execution program for a worker node 110. The calculation data 702 is data that is used for task processing, i.e., including input data, data for which calculation is in process, calculation result data, etc. This calculation data 702 is read when execution of task processing 543 starts and written when it terminates.

The self operating cycle time information 703 is the information for an operating cycle time Tb, based on which the worker node 110 itself executes an operation such as communication processing. This self operating cycle time information 703 is sent to the power supply control unit 530 as control information 503.

The cycle time determination table 704 is referenced by the cycle time determining process 542. Detailed description about the cycle time determination table 704 will be provided later, using FIG. 19.

The remaining amount of power information 705 consists of remaining amount of power information 501 and clock time information 502 at a time instant when the remaining amount of power information 501 has been acquired. That is, it is information indicating the remaining amount of power at each time instant. This remaining amount of power 705 is referenced by the calculation unit 540, when calculating an index of power generation status (which is here an amount of change per unit time in the remaining amount of power).

The minimum operating power quantity information 706 indicates a threshold of the remaining amount of power (i.e., the minimum operating power quantity Eth1) which is used by the power supply control unit 530 for control of the power supply and it is transferred to the power supply control unit 530, as control information 503.

The sleep baseline power quantity information 707 indicates a threshold of the remaining amount of power (i.e., the sleep baseline power quantity Eth2) which is referenced when the calculation unit 540 outputs an operation finished signal.

The worker basic program code 751 is read when the worker node 101 is booted to perform various initial settings and the like. The worker node 110 runs this worker program code 751 until acquiring a worker program code 701 from the master node 101.

Worker Node Operation

In the distributed information processing facility 100 of the first embodiment of the present invention, a major feature lies in the operation of a worker node equipped with a small-output electric power generation unit 511 and a small-capacity electric power storage unit 512. Then, the operation of a worker node 110 is described in detail using FIGS. 8 and 9.

Figure 8:
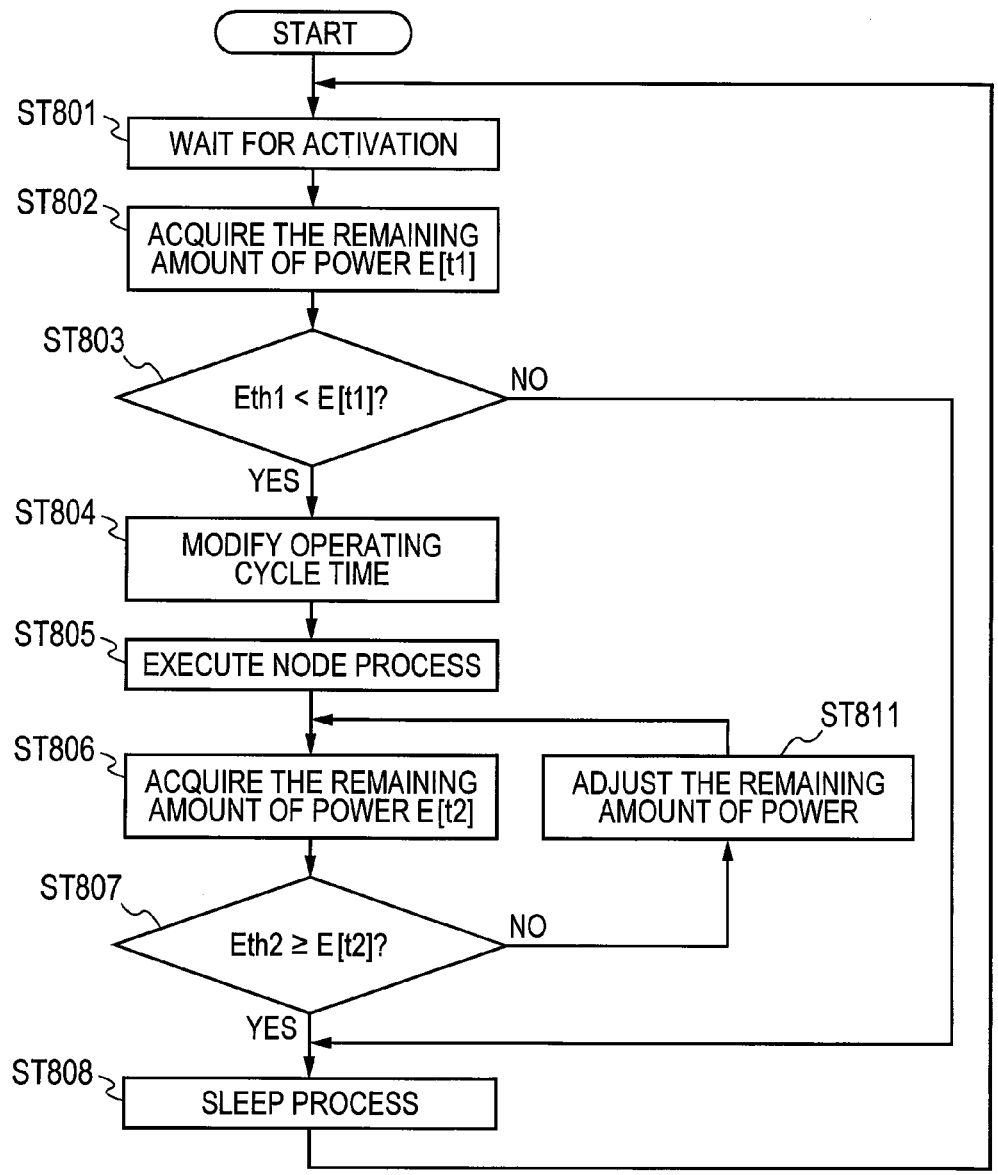
FIG. 8 is a flowchart illustrating the operation of a worker node in the first embodiment of the present invention.

FIG. 8 is a flowchart illustrating the operation of a worker node 110 in the first embodiment of the present invention. The worker node 110, after synchronizing its operation with the master node 101, executes a control logic illustrated in FIG. 8. Before the worker node synchronizes its operation with the master node 101, it could execute a known control logic (see, e.g. Patent Document 2).

At ST801, first, the worker node 110 waits for a coming wakeup time which is set in the wakeup time setting register (ST801). That is, ST801 is an operation during a sleep period Ts.

At the coming wakeup time (hereinafter referred to as "time t1"), proceeding to ST802, the worker node 110 checks the remaining amount of power information 501 and acquires the remaining amount of power E[t1] at time t1 (ST802).

Then, at ST803, the worker node 110 compares the minimum operating power quantity Eth1 (the minimum operating power quantity indicated in the minimum operating power quantity information) in control information 503 with the remaining amount of power E[t1] acquired at ST802 (ST803). If Eth1<E[t1] (Yes, as decided at ST803), the worker node 110 turns on the power supply to the power shutdown region 580 and proceeds to ST804. Otherwise, if Eth1≥E[t1] (No, as decided at ST803), the worker node proceeds to ST808.

If having proceeded to ST804, the worker node executes the cycle time determining process 542 and modifies the self operating cycle time Tb (ST804). The cycle time determining process 542 will be detailed later.

Then, at ST805, the worker node 110 executes a node process (ST805). The node process termed herein includes, inter alia, communication processing (the transmitting process 562 and receiving process 561) and task processing 543. The node process will be detailed later, using FIG. 9.

Then, at ST806, the worker node acquires the remaining amount of power E[2] at the current time (hereinafter referred to as "time t2") (ST806).

Then, at ST807, the worker node 110 compares the remaining amount of power E[t2] acquired at ST806 with the sleep baseline power quantity Eth2 indicated in the sleep baseline power quantity information 707 (ST807). If Eth2≥E[t2] (Yes, as decided at ST807), the worker node stores the remaining amount of power E[t2] and the time t2 as the minimum operating power quantity information 706 into the nonvolatile storage unit 550 and proceeds to ST808. Otherwise, if Eth2<E[t2] (No, as decided at ST807), the worker node proceeds to ST811.

If having proceeded to ST811, the worker node 110 adjusts the remaining amount of power by consuming power for a given period of time or until the remaining amount of power becomes less than the sleep baseline power quantity Eth2 (ST811). Then, the worker node proceeds to ST806.

This ST811 is to be executed during a period of T601 in FIG. 6. That is, by consuming residual power until it becomes less than a predetermined reference value (which is here the sleep baseline power quantity Eth2), the remaining amount of power is prevented from rising due to accumulation of residual power. The operating cycle time determining means (which will be detailed later) in the first embodiment of the present invention might fail to determine an operating cycle time Tb exactly, if the remaining amount of power reaches 100%. Thus, the remaining amount of power is adjusted to less than a predetermined reference value at ST811. At ST811, residual power may be consumed by simply wasting it or consumed by executing task processing to a possible extent.

If having proceeded to ST808, the worker node 110 executes a sleep process (ST808). In particular, the worker node first executes a preparation process for entering a sleep period Ts. That is, the calculation unit 540 sends control information 503 to the power supply control unit 530. Then, the power supply control unit 530 calculates a next wakeup time, based on the clock time information 502 and the self operating cycle time information 703 (i.e., operating cycle time Tb) in the control information 503. The next wakeup time is calculated by a formula: next wakeup time=present wakeup time+operating cycle time Tb. Then, the next wakeup time thus calculated is set in the wakeup time setting register.

Following that, the worker node executes a sleep process and returns to ST801 upon the termination of the sleep process.

By the operation described above, the worker node 110 implements an intermittent operation periodically, while avoiding an event that data for which calculation is in process is corrupted or the like due to that the remaining amount of power becomes zero during a wakeup period Tw.

Figure 9:
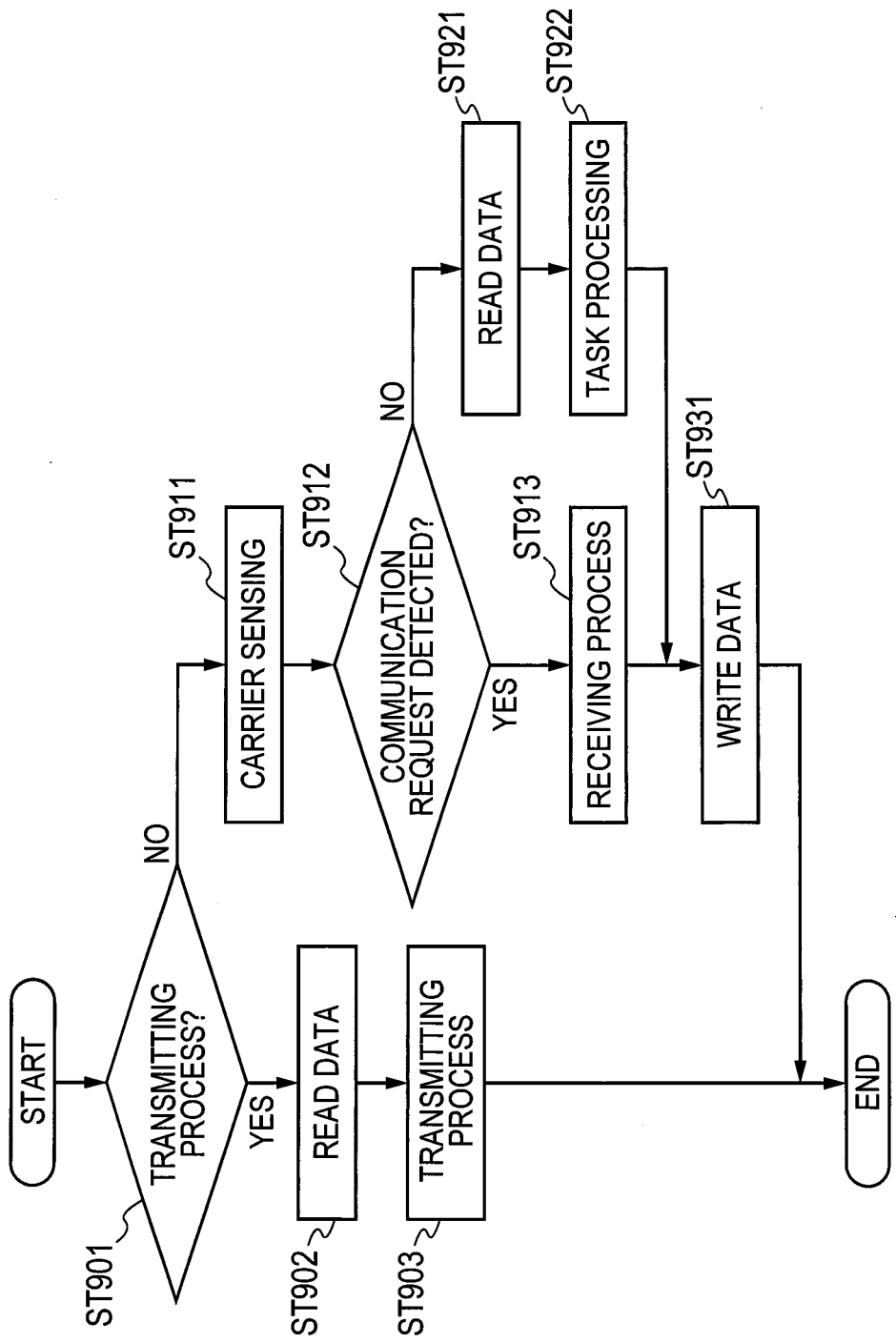
FIG. 9 is a flowchart illustrating a node process in a worker node in the first embodiment of the present invention.

FIG. 9 is a flowchart illustrating a node process in the worker node 110 in the first embodiment of the present invention. Here, the node process which is executed at ST805 in FIG. 8 is detailed.

The node process is roughly divided into three processes: transmitting process 562, receiving process 561, and task processing 543. Here, an operation in which priority is given to communication processing (the transmitting process 562 and receiving process 561) is described by way of example.

At ST901, first, the worker node 110 decides whether the node process to be executed is a transmitting process 562 (ST901). If the transmitting process 562 is to be executed (Yes, as decided at ST901), the worker node proceeds to ST902. Otherwise, if the transmitting process 562 is not to executed (No, as decided at ST901), the worker node proceeds to ST911.

If having proceeded to ST902, the worker node 110 reads calculation data 702 to be transmitted from the nonvolatile storage unit 550 (ST902). Then, proceeding to ST903, the worker node executes the transmitting process 562 via the communication unit 560 and the antenna unit 570 (ST903).

Otherwise, if having proceeded to ST911, the worker node 110 executes a process called carrier sensing for a given period of time to detect for another node transmitting a communication request (ST911). Upon the termination of carrier sensing, the worker node proceeds to ST912.

Then, at ST912, if a communication request has been detected, the worker node 110 decides whether the detected communication request is a request for communication addressed to it (the worker node 110 itself) (ST912). If the communication request is a request for communication addressed to the worker node itself (Yes, as decided at ST912), the worker node proceeds to ST913 for executing a receiving process 561. Otherwise, if the communication request is not a request for communication addressed to the worker node itself (No, as decided at ST912), the worker node proceeds to ST921 for executing task processing 543. At ST912, if the worker node detects no communication request, it may proceed to ST921.

The reason why the task receiving process 561 (ST913) takes priority over the task processing 543 (ST921), as ST912 indicates, is because a transmitting worker node 110 cannot execute next processing until a receiving worker node 110 has completed a receiving process and there is a risk of decreasing the processing efficiency of the distributed information processing facility 100 as a whole.

If having proceeded to ST913, the worker node 110 executes the receiving process 561 by means of the communication unit 560 (ST913). In particular, the communication unit 560 executes the receiving process 561 and data received by the receiving process 561 is transferred to the calculation unit 540. Then, the worker node proceeds to ST931.

If having proceeded to ST921, the worker node 110 reads calculation data required for the task processing 543 from the nonvolatile storage unit 550 (ST921). Then, the worker node proceeds to ST922 and executes the task processing 543 (ST922). Then, the worker node proceeds to ST931.

At ST931, the worker node 110 writes the received data at ST913 or the calculation result data from the task processing 543 at ST922 into the nonvolatile storage unit 550 (ST931).

In the foregoing paragraphs, the examples of the architecture of the distributed information processing facility 100 of the first embodiment of the present invention, the configuration of the master node 101, the configuration of a worker node 110, and the operation of a worker node 110 have been described. In the following, descriptions are provided for a general operation and communication method of the distributed information processing facility 100 and about the operating cycle time determining means (cycle time determining process 542) that is essential for determining an operating cycle time Tb.

System Operation

The operation of the distributed information processing facility 100 is described using FIGS. 10 through 14.

Figure 10:
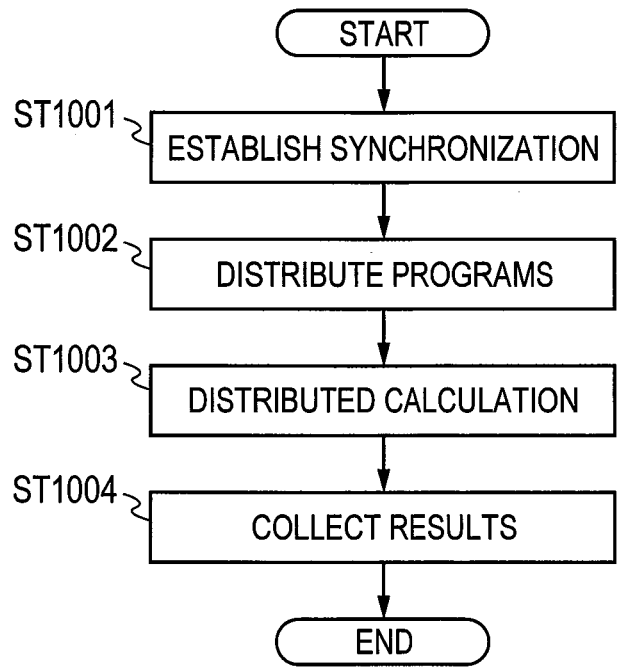
FIG. 10 is a flowchart illustrating operation of the distributed information processing facility 100 of the first embodiment of the present invention.

FIG. 10 is a flowchart illustrating the operation of the distributed information processing facility 100 of the first embodiment of the present invention. The distributed information processing facility 100 carries out distributed information processing by following four steps ST1001 through ST1004 illustrated in FIG. 4.

At ST1001, first, the distributed information processing facility 100 establishes synchronization (ST1001). In particular, synchronization is performed to get timing for communication between the master node 101 and each worker node 110. That is, the operating cycle time Tb of each work node 110 is synchronized to an integer ratio (e.g., a multiple or fraction of power of 2) of the master reference cycle time Tm of the master node 101. The operating cycle time Tb may be synchronized by any other known method.

Figure 11:
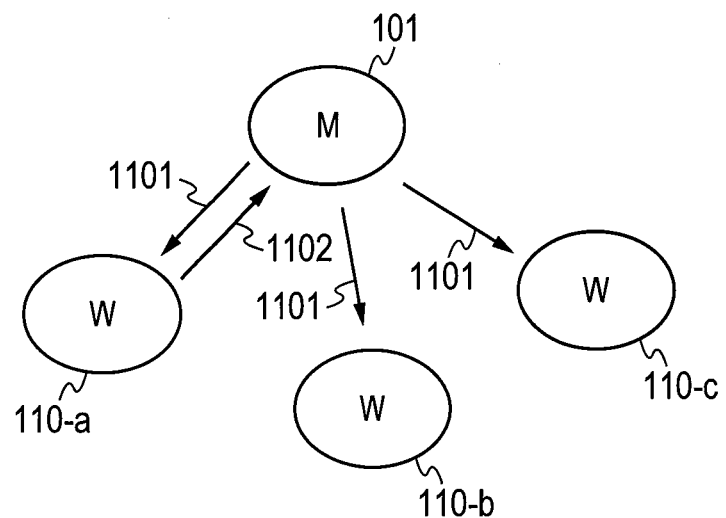
FIG. 11 is a diagram illustrating an operation of establishing synchronization in the distributed information processing facility of the first embodiment of the present invention.

FIG. 11 is a diagram illustrating an operation of establishing synchronization in the distributed information processing facility 100 of the first embodiment of the present invention.

The master node 101 periodically broadcasts a synch reference signal to each of the worker nodes 110. A worker node 110 (worker node 110-a in FIG. 11) that has successfully synchronized with the master node transmits a synchronization complete message 1102 to the master node 101.

The synchronization complete message 1102 includes worker ID information for uniquely identifying each worker node 110. Thus, the master node 101 preserves the worker ID information included in the synchronization complete message 1102 as managed worker ID information 406, so that the master node can recognize which worker node 110 is under its management.

Next, at ST1002, the distributed information processing facility 100 carries out program distribution (ST1002). In particular, the master node 101 distributes, to each worker node 110 successfully synchronized with it, worker program code 402 that is to be executed on each worker node 110.

Figure 12:
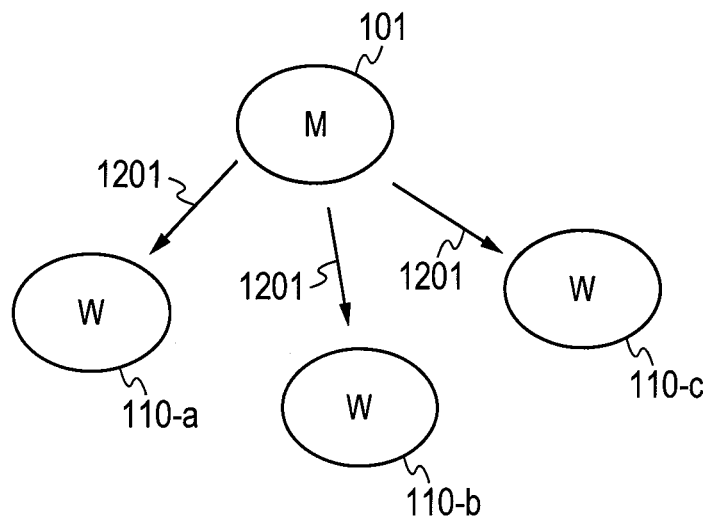
FIG. 12 is a diagram illustrating an operation of program distribution in the distributed information processing facility of the first embodiment of the present invention.

FIG. 12 is a diagram illustrating an operation of program distribution in the distributed information processing facility 100 of the first embodiment of the present invention.

The master node 101 broadcasts a program transmission 1201 to each of the worker nodes 110 successfully synchronized with it, thereby distributing worker program code 402 at once. Each worker node 110 having received the program preserves the received program as the worker program code 701.

Then, at ST1003, the distributed information processing facility 100 executes distributed calculation (ST1003).

Figure 13:
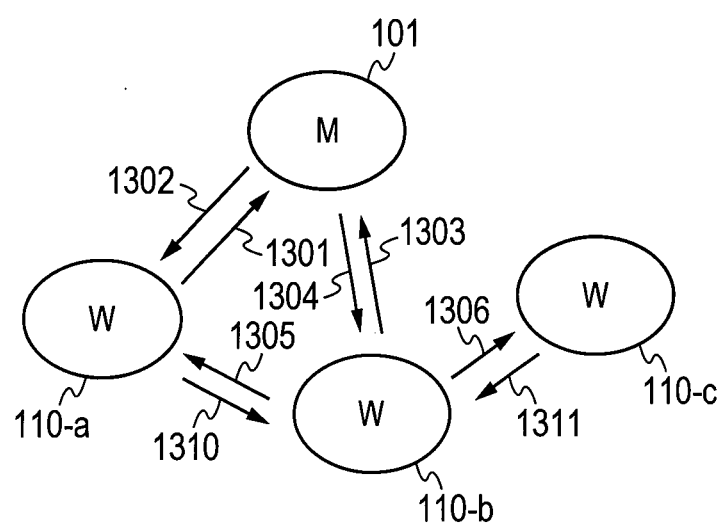
FIG. 13 is a diagram illustrating an operation of distributed calculation in the distributed information processing facility of the first embodiment of the present invention.

FIG. 13 is a diagram illustrating an operation of distributed calculation in the distributed information processing facility 100 of the first embodiment of the present invention.

Each worker node 110 (worker node 110-a in FIG. 13) having received the program at ST1002 transmits a task request 1301 to the master node 101. The self operating cycle time information 703 of the worker node 110-a is attached to the task request 1301.

The master node 101 determines a task to be assigned, based on the operating cycle time Tb information indicated in the self operating cycle time information 703 attached to the received task request 130. In particular, the master node refers to the size of each task stored in the task table 407 and assigns a larger task to the worker node, if the worker node has a smaller operating cycle time Tb, and vice verse. Thereby, it is possible to enhance the efficiency of the distributed information processing. Then, the master node 101 transmits the determined task 1302 to the worker node 110-a. The transmission data includes input data 403 that is used for processing of the task 1302.

The worker node (worker node 110-a in FIG. 13), once having finished the task processing, transmits a task finished message 1303 (and a next task request) to the master node 101. In turn, the master node 101 transmits a next task 1304 to a worker node 110-b.

If the task 1304 is to process result data from the task processing executed by the worker nodes 110-a, 110c, the worker node 110-b transmits data requests 1305, 1306 to the worker nodes 110-a, 110c, respectively. After receiving data 1310, 1311 necessary for processing the task 1304, the worker node 110-b executes the processing of the task 1034.

Then, at ST1004, the distributed information processing facility 100 collects results (ST1004).

Figure 14:
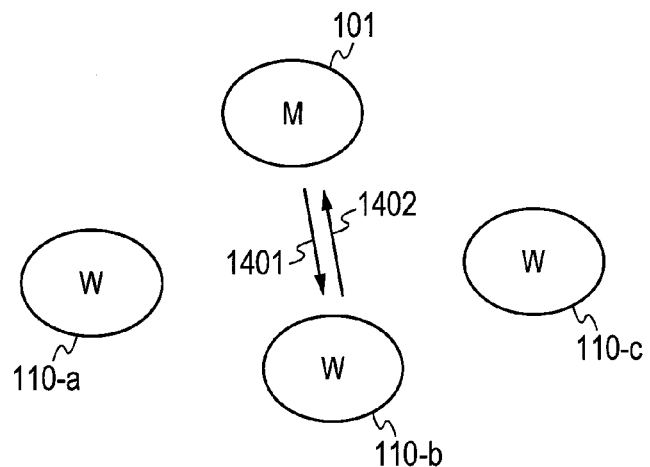
FIG. 14 is a diagram illustrating an operation of collecting results in the distributed information processing facility of the first embodiment of the present invention.

FIG. 14 is a diagram illustrating an operation of collecting results in the distributed information processing facility 100 of the first embodiment of the present invention.

The master node 101 transmits a calculation result request 1401 to a worker node 110 (worker node 110-b in FIG. 14) preserving calculation result data and receives a calculation result 1402.

In distributed information processing, final calculation result data may spread and be stored in multiple worker nodes 110 as partial calculation result data. In such as case, the master node 101 acquires final calculation result data by collecting and combining partial calculation result data from all worker nodes 110 in which such data is stored.

Communication Method

As noted previously, in distributed information processing, communication between nodes is a bottleneck in terms of processing performance. Therefore, it is desirable that a communication rate is as large as possible. The communication rate of each worker node 110 in the first embodiment of the present invention is largely affected by a power generation status of the worker node 110. This is because the maximum communication rate of each worker node 110 depends on the maximum communication frequency (that is, operating cycle time Tb) and the operating cycle time Tb is affected by the power generation status.

Thus, the distributed information processing facility 100 of the first embodiment of the present invention adopts a communication method in which each worker node 110 sets a cycle time (i.e., operating cycle time Tb) to transit into a communication state, taking account of its own power generation status. For two worker nodes 110 to communicate with each other, a communication rate is set to be fit for a worker node having a larger operating cycle time Tb. Consequently, node-to-node communication at a possibly high communication rate is feasible.

Figure 15:
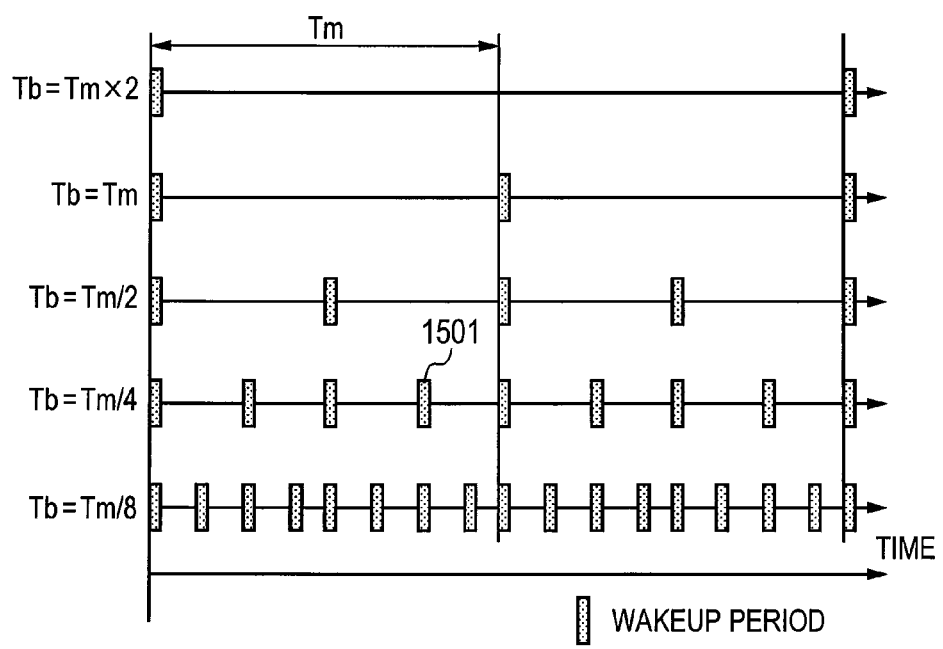
FIG. 15 is a diagram for explaining an example of a communication method for the distributed information processing facility of the first embodiment of the present invention.

FIG. 15 is a diagram for explaining an example of a communication method for the distributed information processing facility 100 of the first embodiment of the present invention.

The distributed information processing facility 100 of the first embodiment of the present invention adopts a communication method in which each worker node 110 sets its communication frequency (i.e., operating cycle time Tb) to be a multiple or fraction of power of 2 ( . . . , ¼, ½, 1, 2, . . . ) of the master reference cycle time Tm.

By setting the operating cycle time Tb in this way, each worker node can set a communication rate as high as possible according to its own power generation status and can find a correspondent worker node 110 with ease. As for protocols to change the operating cycle time Tb, there are a number of methods in the field of sensor networks and, therefore, description thereof is here dispensed with.

Operating Cycle Time Determining Means (Cycle Time Determining Process 542)

Each worker node 110 has an operating cycle time determining means that predicts an operating cycle time enabling stable operation in its own power generation status, determines a suitable operating cycle time Tb, and accordingly modifies (changes) its own operating cycle time Tb. This means is detailed below, using FIGS. 16, 17, and 18.

In the distributed information processing facility 100 of the first embodiment of the present invention, an operating cycle time Tb is determined, based on, not the remaining amount of power, but a gradient of the remaining amount of power (an amount of change per unit time in the remaining amount of power). If control based on the remaining amount of power is implemented, the breadth of control of operating cycle time Tb depends on how much capacity the electric power storage unit 512 has. Therefore, a large breadth of control of operating cycle time Tb cannot be allowed for the small-capacity electric power storage unit 512. By contrast, in the case of control based on a gradient of the remaining amount of power, the breadth of control of operating cycle time Tb does not depend on how much capacity the electric power storage unit 512 has. Therefore, a large breadth of control of operating cycle time Tb is allowed even for the small-capacity electric power storage unit 512 and flexible communication rate setting is possible.

Figure 16:
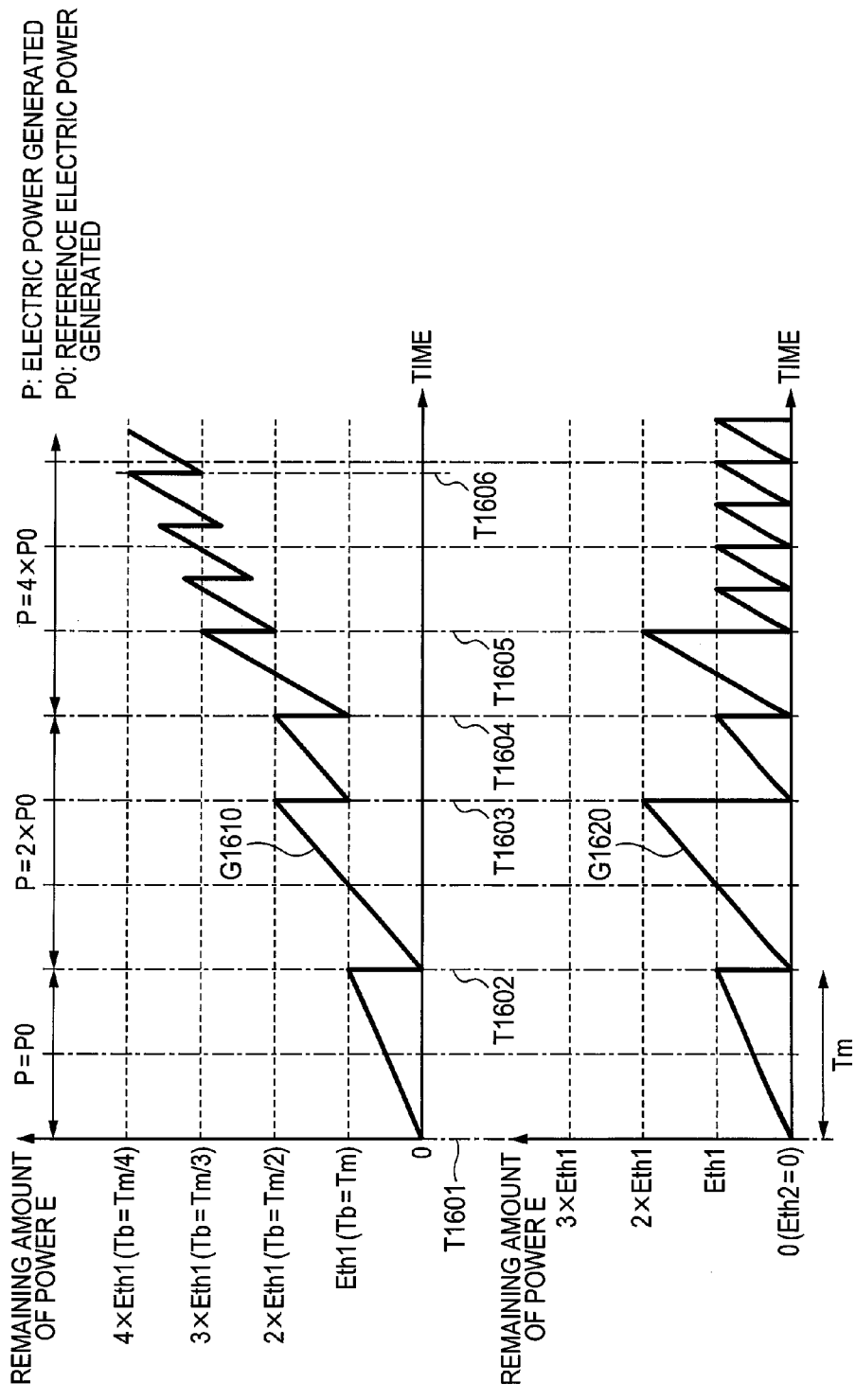
FIG. 16 is a diagram for explaining an operating cycle time determining means in the first embodiment of the present invention.

FIG. 16 is a diagram for explaining the operating cycle time determining means in the first embodiment of the present invention.

FIG. 16 shows method 1 of determining an operating cycle time Tb, which uses the remaining amount of power as the power generation status index (a related art method shown in the upper part of FIG. 16) and method 2 of determining an operating cycle time Tb, which uses a gradient of the remaining amount of power as the power generation status index (the operating cycle time determining means in the first embodiment of the present invention shown in the lower part of FIG. 6).

It is assumed that a wakeup period Tw is very small in comparison with a sleep period Ts. It is also assumed that the amount of power that is consumed by the worker node 110 for one wakeup period Tw is the minimum operating power quantity Eth1. Moreover, it is assumed for method 2 that the sleep baseline power quantity Eth2 is zero.

In method 1, if, for example, the remaining amount of power E is 2×Eth1>E≥Eth1, then the operating cycle time Tb is set equal to the master reference cycle time Tm. If, for example, the remaining amount of power E is 3×Eth1>E≥2×Eth1, then Tb is set equal to Tm/2. Transition of the remaining amount of power E in method 1 is marked G1610.

On the other hand, in method 2, if, for example, the remaining amount of power E has increased to Eth1 during a period denoted by the master reference cycle time Tm (i.e., a period between T1601 and T1602), then Tb is set equal to Tm. If, for example, the remaining amount of power E has increased to 2×Eth1 during the same period, Tb is set equal to Tm/2. Transition of the remaining amount of power E in method 2 is marked G1620.

In addition, electric power generated P by the electric power generation unit 511 changes with time. It is assumed that P=P0 (P0 is reference electric power generated) during a period from time T1601 to time T1602, the power generation status is enhanced twice, P=2P0 during a period from time T1602 to time T1604, and the power generation status is further enhanced twice, P=4P0 during a period after time T1604.

In method 1, Tb remains at Tm for a wakeup period Tw at time T1602. However, subsequently, the electric power generated P becomes P=2P0 and the remaining amount of power E reaches 2×Eth1 at time T1603. Thus, Tb is modified to Tm/2 for a wakeup period Tw at time T1603. Furthermore, the electric power generated P becomes P=4P0 for a period after time T1604 and the remaining amount of power E reaches 3×Eth1 at time T1605. Thus, Tb is modified to Tm/3 for a wakeup period Tw at time T1605. At time T1606, the remaining amount of power E reaches 4×Eth1. Thus, Tb is modified to Tm/4 for a wakeup period Tw at time T1606.

On the other hand, in method 2, Tb remains at Tm for a wakeup period Tw at time T1602. However, subsequently, the electric power generated P becomes P=2P0 and, at time T1603, the remaining amount of power E increases to 2×Eth1 for the Tm period. Thus, Tb is modified to Tm/2 for a wakeup period Tw at time T1603. Following that, by ST811 in FIG. 8 (adjusting the remaining amount of power), the remaining amount of power E is reset to the sleep baseline power quantity Eth2 (namely, zero). Furthermore, the electric power generated P becomes P=4P0 for a period after time T1604 and the remaining amount of power E increases to 4×Eth1 for the Tm period. Thus, Tb is modified to Tm/4 for a wakeup period Tw at time T1605. Following that, by ST811 in FIG. 8, the remaining amount of power E is reset to the sleep baseline power quantity Eth2.

As noted above, in the case of method 1, the electric power storage unit 512 needs to have a capacity of 4×Eth1 in order to set the operating cycle time Tb to Tm/4. On the other hand, in the case of method 2, the electric power storage unit 512 is only required to have a capacity of 2×Eth1. This means that, according to method 2, a sufficient breadth of control of operating cycle time Tb can be allowed even for the small-capacity electric power storage unit 512 and a flexible communication rate (suitable operating cycle time Tb) can be set.

Figure 17:
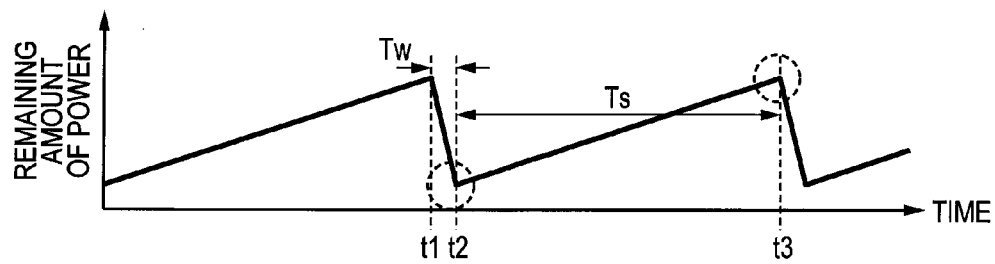
FIG. 17 is a diagram illustrative of timing to acquire remaining amount of power information in the first embodiment of the present invention.

FIG. 17 is a diagram illustrative of timing to acquire the remaining amount of power information 501 in the first embodiment of the present invention.

The operating cycle time determining means acquires the remaining amount of power E[t2] at time t2 when transition to a sleep period Ts occurs and the remaining amount of power E[t3] at time t3 when transition to a wakeup period Tw occurs. The timings to acquire each remaining amount of power correspond to ST802 and ST806, respectively, in FIG. 8. Accordingly, a value of gradient a of the remaining amount of power (hereinafter simply referred to as a "value of gradient a") can be calculated by equation (1).

[Equation 1]

$$a = (E[t3] - E[t2])/(t3 - t2) \quad (1)$$

Next, for the calculated value of gradient a, the operating cycle time determining means obtains an integer n that fulfills a condition as defined by equation (2), where Const is an arbitrary constant of 0 or more.

[Equation 2]

$$(1+\text{Const}) \times (2^{n+1}) > a \geq (1+\text{Const}) \times (2^n) \qquad (2)$$

Then, by equation (3), the operating cycle time determining means calculates a value of gradient b which corresponds to the corrected value of gradient a by the obtained integer n.

[Equation 3]

$$b = 2^n \qquad (3)$$

By calculating the value of gradient b which corresponds to the corrected value of gradient a as above, the operating cycle time determining means enables the worker node 110 to operate stably, unaffected by a change in the power generation status. This reason is described using FIG. 18.

Figure 18:
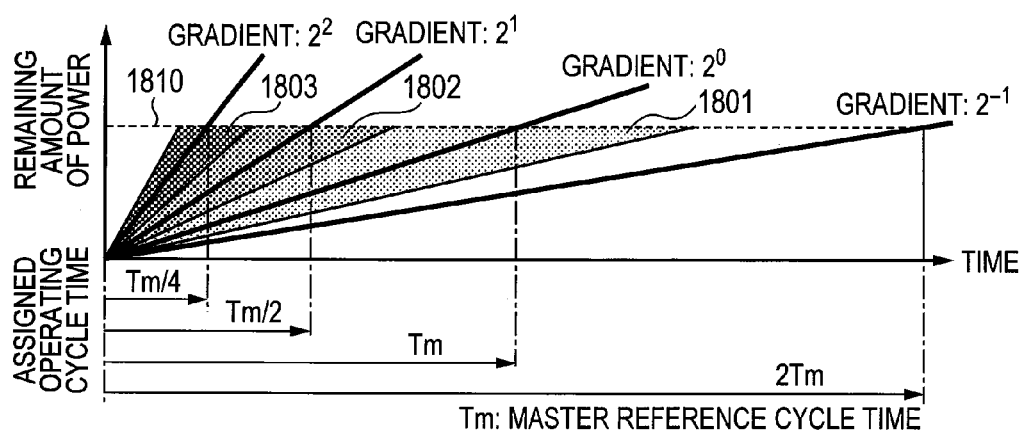
FIG. 18 is a diagram showing a relationship between values of gradient a and its corrected values of gradient b of the remaining amount of power and assigned values of operating cycle time Tb in the first embodiment of the present invention.

FIG. 18 is a diagram showing a relationship between values of gradient a and its corrected values of gradient b of the remaining amount of power and assigned operating cycle times Tb in the first embodiment of the present invention.

In the example shown in FIG. 18, if a line of a value of gradient a lies in a region 1801, the value of gradient is corrected to $2^{-1}$; if the line lies in a region 1802, the value of gradient is corrected to $2^0$; and if the line lies in a region 1803, the value of gradient is corrected to $2^1$. That is, the diagram of FIG. 18 shows that a calculated value of gradient a is corrected to an underestimated value of b. The diagram of FIG. 18 further shows that 2Tm, Tm, Tm/2, and Tm/4 as operating cycle times Tb are assigned to the corrected values of gradient $2^{-1}$, $2^0$, $2^1$, and $2^2$, respectively in a correspondence manner.

The worker node 110 determines an operating cycle time Tb so that the amount of power equal to or more than a predetermined remaining amount of power 1810 (e.g., the minimum operating power quantity Eth1) remains stored at the time of end of a sleep period Ts. The reason for this is because the worker node 110 is unable to operate if the amount of power only less than the minimum operating power quantity Eth1 remains stored until a next wakeup period Tw.

However, the electric power generated by natural energy such as solar energy changes over time. Therefore, in a case of using operating cycle time Tb determined by a value of gradient a, a decrease in the amount of electric power generated, if occurred over time, may result in that the predetermined remaining amount of power 1810 does not remain stored at the time of end of a sleep period Ts. Thus, the correction is made so that the values of gradient a are underestimated only by the proportion of Const.

Consequently, even if the amount of electric power generated falls during a sleep period Ts, thus reducing the values of gradient a as much as the proportion of Const, the amount of power equal to or more than the predetermined remaining amount of power 1810 can remain stored until a next wakeup period Tw. Accordingly, operation in the next wakeup period Tw is enabled. In other words, the worker node 110 can operate stably, unaffected by a change in the power generation status.

In this way, by assigning operating cycle time Tb to a value of gradient b, namely, the corrected value of gradient a, not the value of gradient a, it is possible to set an operating cycle time Tb that enables stable operation unaffected by a change in the power generation status. FIG. 18 shows the example in which normalization is applied such that, when the value of gradient is 1, the assigned operating cycle time is Tm.

Figures 19, 20A:
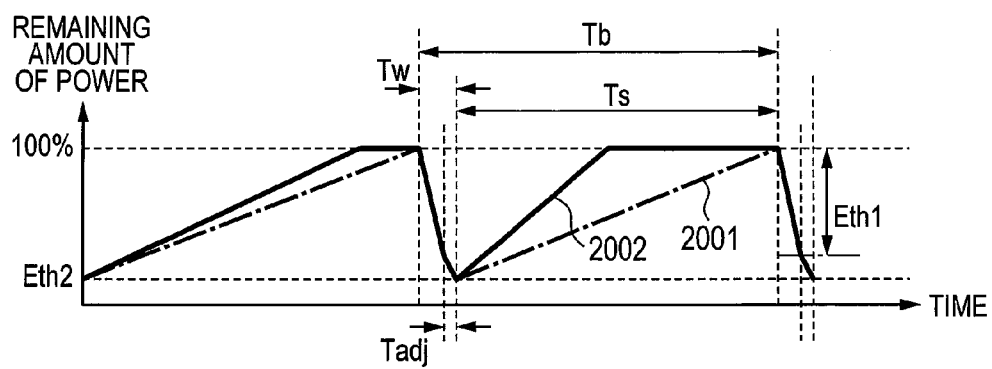
FIG. 19 is a diagram showing an example of a cycle time determination table in the first embodiment of the present invention.
FIG. 20A is a diagram for explaining the operating cycle time determining means in the first embodiment as a premise for an operating cycle time determining means in a second embodiment of the present invention.

FIG. 19 is a diagram showing an example of a cycle time determination table 704 in the first embodiment of the present invention. As described previously, the cycle time determination table 704 is referenced by the cycle time determining process 542.

The cycle time determination table 704 shown in FIG. 19 stores information representing mapping between values of gradient a and operating cycle times Tb, when Const=0.2. The cycle time determining process 542 calculates a value of gradient a and refers to this cycle time determination table 704, and determines an operating cycle time Tb associated with the value of gradient a (modifying the operating cycle time at ST804 in FIG. 8).

If, for example, the value of gradient a is 1, it falls within 1.2>a (=1)>9 in the range cycle time determination table 704 and thus the operating cycle time Tb is determined as 2Tm.

The operating cycle time determining means described above sets a suitable operating cycle time Tb adaptive to power generation status in a worker node 110 equipped with the small-output electric power generation unit 511 and the small-capacity electric power storage unit 512. Thereby, node-to-node communication at a high communication rate is enabled and high-speed distributed information processing can be achieved.

In the first embodiment of the present invention described above, the amount of change per unit time in the remaining amount of power is an index that is influenced by power generation status, but independent of the capacity of the electric power storage unit 512. Therefore, the problem of reducing the breadth of communication rate control can be avoided. In a case where the electric power generation unit 511 generates electric power, for example, by photovoltaic generation or the like, power generation status undergoes a modest change over time. Therefore, the problem in which the communication rate becomes unstable can also be avoided.

Each worker node 110 dynamically changes the self operating cycle time Tb based on information (which is here a value of gradient a) indicating a change in the electric power stored in its electric power storage unit 512, but still can maintain synchronization with any other worker node 110. Therefore, it is possible to draw out the processing performance of each worker node 110.

Second Embodiment

In a second embodiment, there is described an example of a distributed information processing facility 200 in which a worker node is equipped with an electric power storage unit 512 having an even smaller capacity than that in the above-described first embodiment.

FIG. 20A is a diagram for explaining the operating cycle time determining means in the first embodiment as a premise for an operating cycle time determining means in the second embodiment of the present invention. This diagram shows an example of application of the operating cycle time determining means in the first embodiment to a case in which the capacity of the electric power storage unit 512 used is in the order of less than two times of the minimum operating power quantity Eth1.

As shown in FIG. 20A, if the remaining amount of power has reached an upper limit of 100% halfway in a sleep period Ts, the operating cycle time determining means in the above-described first embodiment cannot calculate a suitable value of gradient. This is because the calculated value of gradient 2001 largely differs from an actual value of gradient 2002.

Figure 20B:
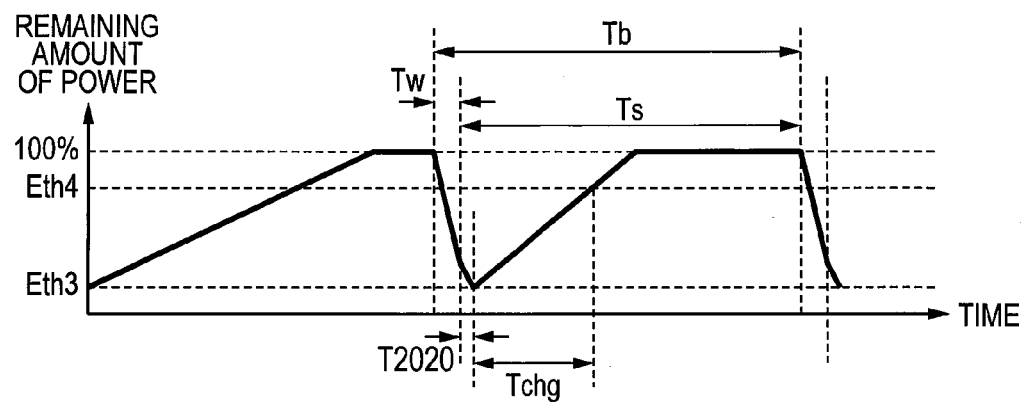
FIG. 20B is a diagram for explaining the operating cycle time determining means in the second embodiment of the present invention.

FIG. 20B is a diagram for explaining the operating cycle time determining means in the second embodiment of the present invention. The operating cycle time determining means in the second embodiment of the present invention calculates a suitable value of gradient according to a method as will be described below.

Specifically, the operating cycle time determining means in the second embodiment of the present invention does not calculate a gradient of the remaining amount of power. Instead, it measures a charging time Tchg taken for charging from the remaining amount of power from which measurement should start Eth3, which has been preset, up to the remaining amount of power at which measurement should terminate Eth4 and determines an operating cycle time Tb based on the measured charging time Tchg.

By this method, it is possible to set a suitable operating cycle time Tb and achieve a possibly high communication rate, even in the case in which the used electric power storage unit 512 has only a small capacity in the order of less than two times of the minimum operating power quantity Eth1.

Figure 21:
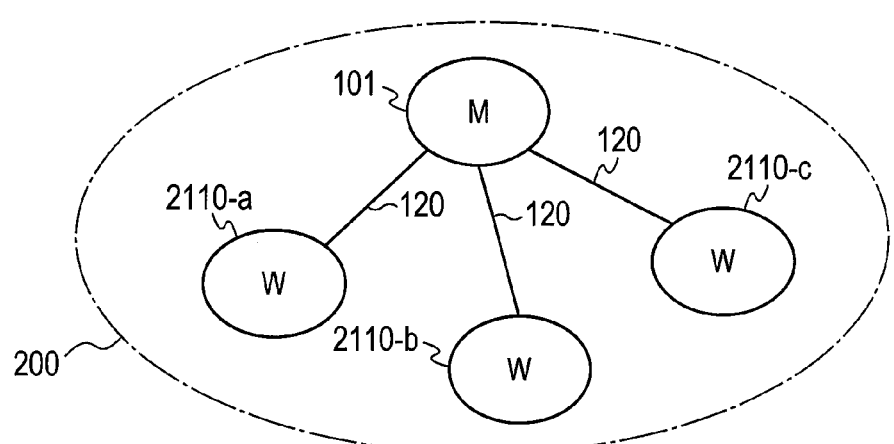
FIG. 21 is a diagram showing an example of overall architecture of a distributed information processing facility of the second embodiment of the present invention.

FIG. 21 is a diagram showing an example of overall architecture of the distributed information processing facility 200 of the second embodiment of the present invention. In the following, components that serve in the same way as those in the previously described first embodiment (see FIG. 1) are assigned the same reference numerals and duplicative descriptions are dispensed with, as appropriate.

In the distributed information processing facility 200 shown in FIG. 21, the configuration of each worker node 2110 and the operating cycle time determining means differ from those in the distributed information processing facility 100 shown in FIG. 1.

Worker Node Configuration

Figure 22:
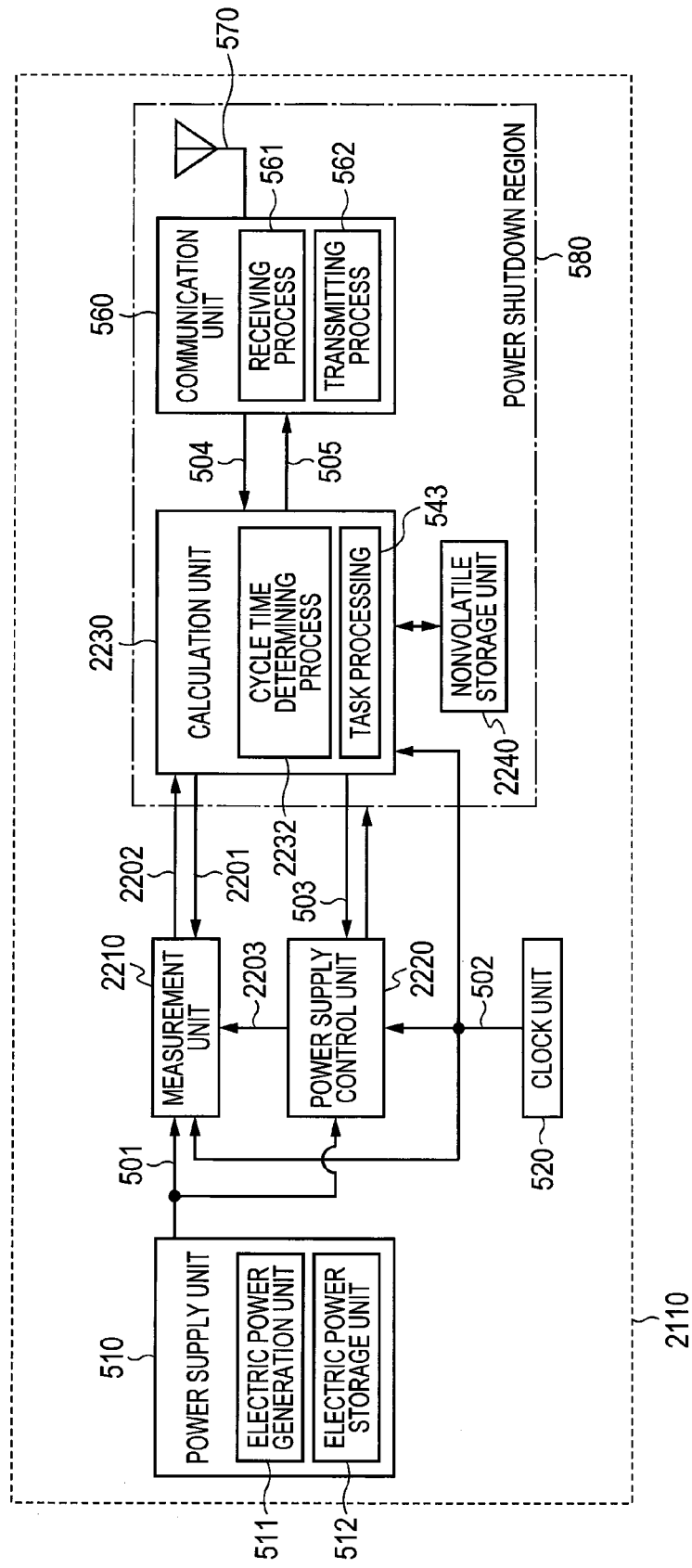
FIG. 22 is a diagram showing an example of a configuration of a worker node in the second embodiment of the present invention.

FIG. 22 is a diagram showing an example of a configuration of a worker node 2110 in the second embodiment of the present invention. In the following, components that serve in the same way as those in the previously described first embodiment (see FIG. 5) are assigned the same reference numerals and duplicative descriptions are dispensed with, as appropriate.

The worker node 2110 includes a power supply unit 510, a clock unit 520, a measurement unit 2210, a power supply control unit 2220, a calculation unit 2230, a nonvolatile storage unit 2240, a communication unit 560, and an antenna unit 570.

The measurement unit 2210 is a module that measures time for charging electric power up to a predetermined amount of power is stored. This measurement unit 2210 is triggered by an operation start trigger 2203 which is input from the power supply control unit 2220. Based on the remaining amount of power information 501, clock time information 502, and measurement period setting information 2201 (the remaining amount of power from which measurement should start Eth3 and the remaining amount of power at which measurement should terminate Eth4 set by the calculation unit 2230), the measurement unit 2210 measures a charging time Tchg and outputs charging time information 2202 indicating the measured charging time Tchg to the calculation unit 2230.

The power supply control unit 2220 is a module that performs switching on/off of the power supply to a power shutdown region 580 based on the remaining amount of power information 501, clock time information 502, and control information 503. This power supply control unit 2220 differs from the power supply control unit 530 in FIG. 5 in that it outputs the operation start trigger 2203 to the measurement unit 2210. The operation start trigger 2203 is sent when the power supply to the power shutdown region 580 is turned off.

The calculation unit 2230 is a module for executing a calculation program and is generally configured with a CPU.

This calculation unit 2230 sets measurement period setting information 2201 (the remaining amount of power from which measurement should start Eth3 and the remaining amount of power at which measurement should terminate Eth4) for the measurement unit 2210. Difference from the calculation unit 540 in FIG. 5 resides in this setting operation and processing detail of a cycle time determining process 2232. The cycle time determining process (operating cycle time determining means) 2232 determines an operating cycle time Tb based on an index of power generation status (which is here the charging time Tchg).

This calculation unit 2230 reads measurement period setting information 2307 (see FIG. 23) from the nonvolatile storage unit 2240 according to a command or the like from the master node 101 and provides it to the measurement unit 2210 as the measurement period setting information 2201.

The nonvolatile storage unit 2240 is a module that is capable of retaining data even when the power supply is off and it is, for example, ROM, FeRAM, flash memory, or the like. Various sorts of information which are stored in the nonvolatile storage unit 2240 will be described later using FIG. 23.

Figure 23:
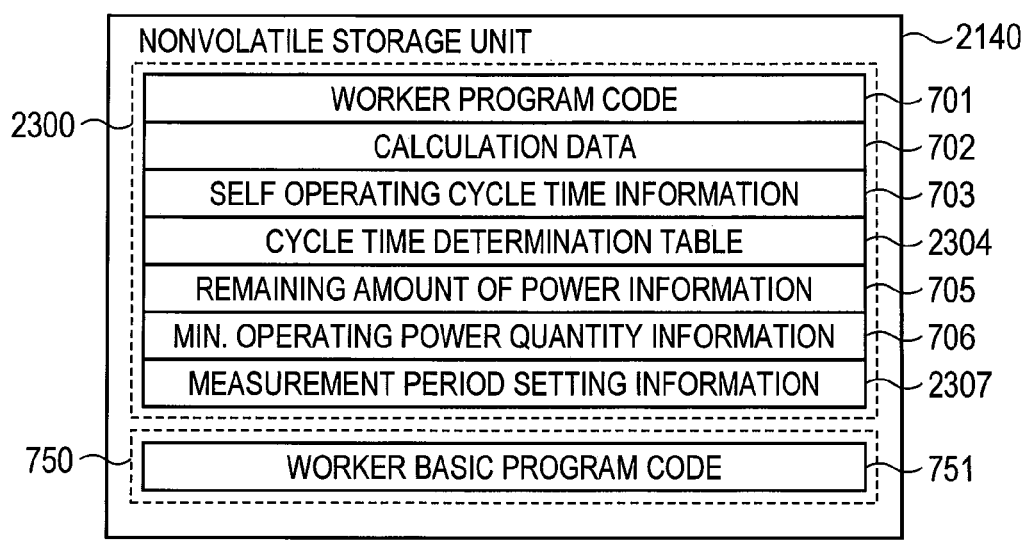
FIG. 23 is a diagram illustrating what information is stored in a nonvolatile storage unit of a worker node in the second embodiment of the present invention.

FIG. 23 is a diagram illustrating what information is stored in the nonvolatile storage unit 2240 of a worker node 2110 in the second embodiment of the present invention. In the following, components that serve in the same way as those in the previously described first embodiment (see FIG. 7) are assigned the same reference numerals and duplicative descriptions are dispensed with, as appropriate.

The nonvolatile storage unit 2240 has a RAM part 2300 and a ROM part 750.

The RAM part 2300 holds a cycle time determination table 2304 and measurement period setting information 2307 unlike the RAM part 700 in FIG. 5.

The cycle time determination table 2304 is referenced by the cycle time determining process 2232. Detailed description about the cycle time determination table 2304 will be provided later, using FIG. 26.

The measurement period setting information 2307 represents a set period of measurement to be performed by the measurement unit 2210. In particular, this information comprises the remaining amount of power from which measurement should start Eth3 and the remaining amount of power at which measurement should terminate Eth4. This measurement period setting information 2307 is sent to the measurement unit 2210 as measurement period setting information 2201.

Figure 24:
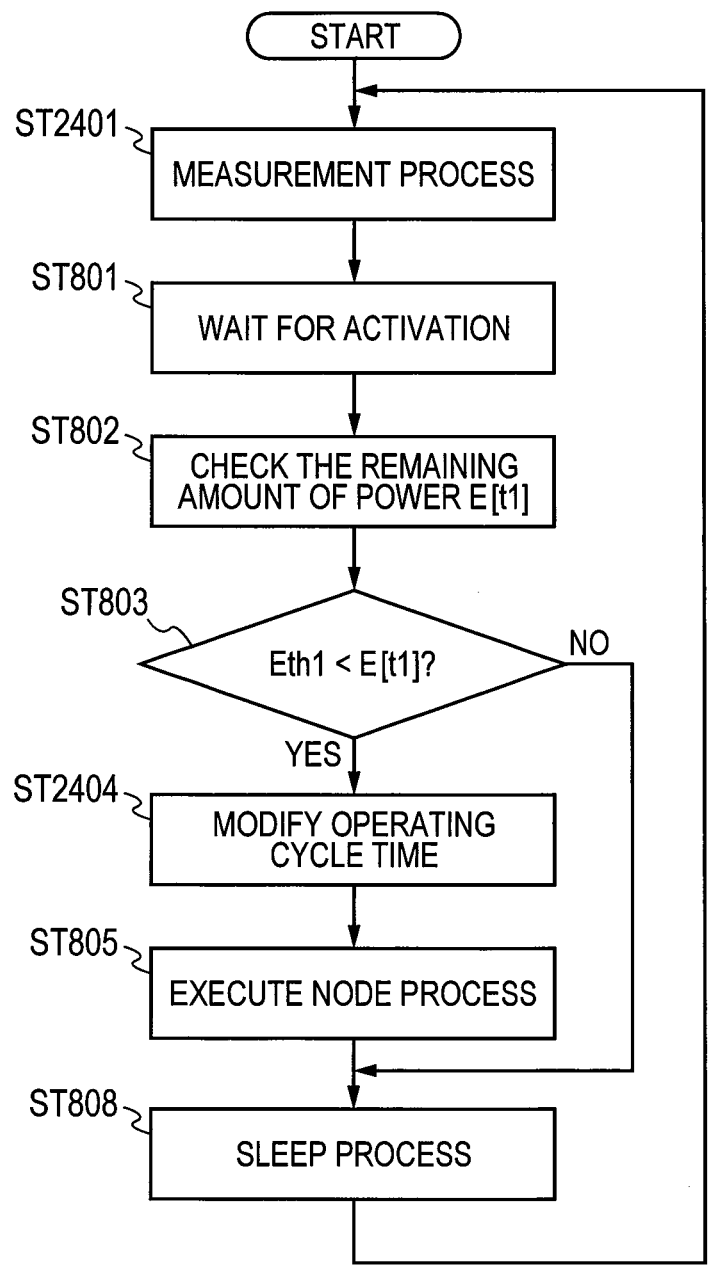
FIG. 24 is a flowchart illustrating the operation of a worker node in the second embodiment of the present invention.

FIG. 24 is a flowchart illustrating the operation of a worker node 2110 in the second embodiment of the present invention. In the following, components that serve in the same way as those in the previously described first embodiment (see FIG. 8) are assigned the same reference numerals and duplicative descriptions are dispensed with, as appropriate.

The flowchart shown in FIG. 24 differs from the flowchart of FIG. 8 in that ST2401 (measurement process) is added and in processing detail of ST2404 (modifying the operating cycle time). These two steps are described below. Although ST806, ST807, and ST811 are omitted from FIG. 24, these steps may be executed.

At ST2401, the worker node 2110 is triggered by an operation start trigger 2203 and measures a charging time Tchg (ST2401). This ST2401 is to be executed during a sleep period Ts. Details about ST2401 will be described using FIG. 25.

At ST2404, the worker node 2110 executes the cycle time determining process 2232 and modifies the self operating cycle time Tb (ST2404). The cycle time determining process 2232 will be detailed later.

Figure 25:
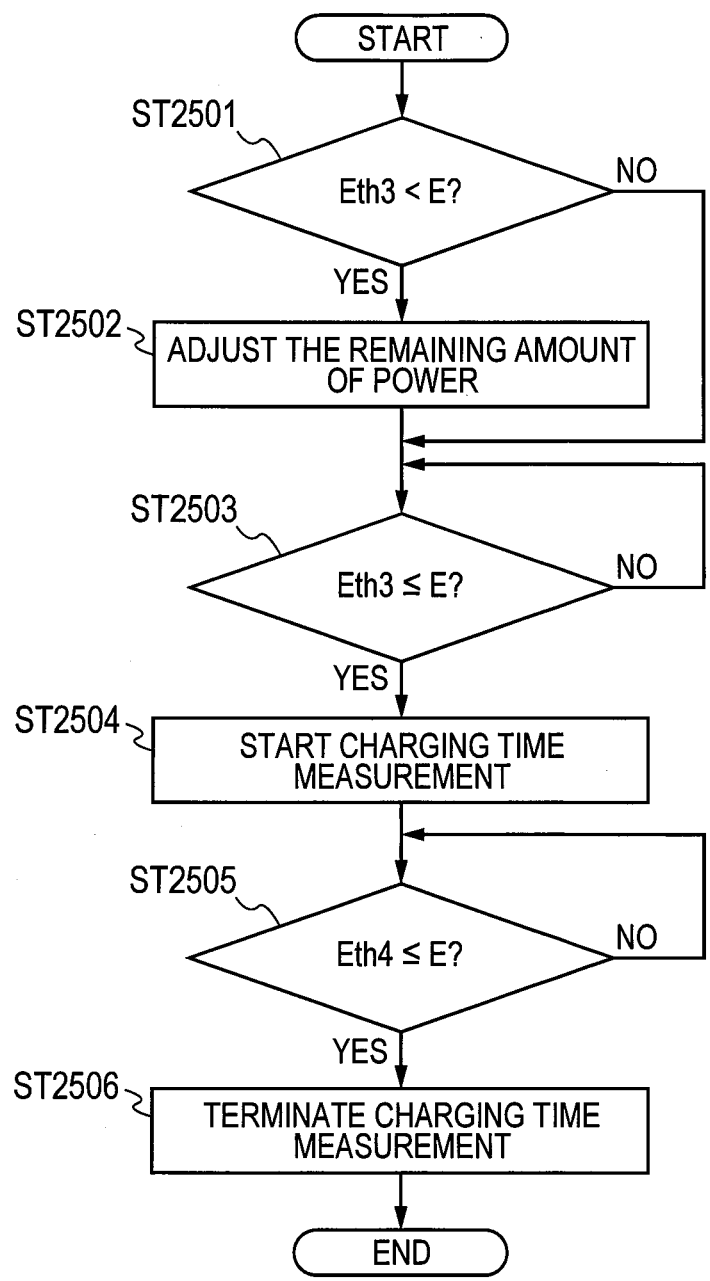
FIG. 25 is a flowchart illustrating a measurement process which is carried out by a worker node 2110 in the second embodiment of the present invention.

FIG. 25 is a flowchart illustrating the measurement process which is carried out by a worker node 2110 in the second embodiment of the present invention. Here, details about ST2401 are described.

At ST2501, first, the worker node 2110 acquires the remaining amount of power information 501 (remaining amount of power E) and compares the acquired remaining amount of power E with the remaining amount of power from which measurement should start Eth3 (ST2501). If Eth3<E (Yes, as decided at ST2501), then the worker node proceeds to ST2502. Otherwise, if Eth3≥E (No, as decided at ST2501), then the worker node proceeds to ST2503.

If having proceeded to ST2502, the worker node 2110 adjusts the remaining amount of power by consuming power until the remaining amount of power E becomes less than the remaining amount of power from which measurement should start Eth3 (ST2502). ST2502 is to once reduce the remaining amount of power E less than the remaining amount of power from which measurement should start Eth3 in order to measure a charging time Tchg from the remaining amount of power from which measurement should start Eth3 to the remaining amount of power at which measurement should terminate Eth4 during a sleep period.

This ST2502 is to be executed during a period of T2020 in FIG. 20B. Once the remaining amount of power E has become less than the remaining amount of power from which measurement should start Eth3, the worker node proceeds to ST2503. At ST2502, residual power may be consumed by simply wasting it or consumed by executing task processing to a possible extent.

If having proceeded to ST2503, the worker node 2110 waits until the remaining amount of power E becomes equal to or more than the remaining amount of power from which measurement should start Eth3 (ST2503). Once the remaining amount of power E has become equal to or more than the remaining amount of power from which measurement should start Eth3 (Yes, as decided at ST2503), the worker node proceeds to ST2504 and starts to measure a charging time Tchg (ST2504).

Then, at ST2505, the worker node 2110 waits until the remaining amount of power E becomes equal to or more than the remaining amount of power at which measurement should terminate Eth4 (ST2505). Once the remaining amount of power E has equal to or more than the remaining amount of power at which measurement should terminate Eth4 (Yes, as decided at ST2505), the worker node proceeds to ST2506 and terminates the measurement of a charging time Tchg (ST2506).

By the process described above, the measurement unit 2210 measures a charging time Tchg taken for charging from the remaining amount of power from which measurement should start Eth3 to the remaining amount of power at which measurement should terminate Eth4

Here, details about ST2404 in FIG. 24 are described. At ST2404, the worker node 2110 determines an operating cycle time Tb based on charging time information 2202 (charging time Tchg) by using the cycle time determining process (operating cycle time determining means) 2232.

In particular, for the measured charging time Tchg, the operating cycle time determining means first obtains an integer n that fulfills a condition as defined by equation (4), where Const is an arbitrary constant of 0 or more.

[Equation 4]

$$(1+\text{Const}) \times (2^{n+1}) > T\text{chg} \geq (1+\text{Const}) \times (2^n) \tag{4}$$

Then, the operating cycle time determining means calculates an operating cycle time Tb based on the obtained n, according to equation (5).

[Equation 5]

$$Tb = Tm \times 2^n \tag{5}$$

As above, the charging time Tchg is corrected so that it is overestimated only by the proportion of Const. Based on the corrected value of Tchg, the operating cycle time determining means determines an operating cycle time Tb. Thereby, even if the amount of electric power generated falls during a sleep period Ts, thus lengthening the charging time Tchg as long as the proportion of Const, the amount of power equal to or more than a predetermined remaining amount of power can remain stored until a next wakeup period Tw. Accordingly, operation in the next wakeup period Tw is enabled. In other words, the worker node 110 can operate stably, unaffected by a change in the power generation status.

Figures 26, 27:
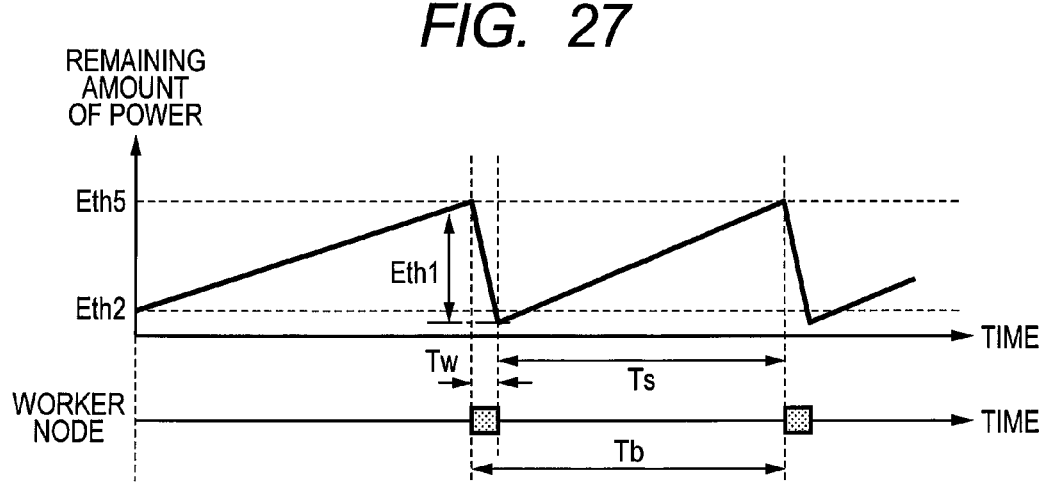
FIG. 26 is a diagram showing an example of a cycle time determination table in the second embodiment of the present invention.
FIG. 27 is a diagram illustrating an example of operation of a worker node in a third embodiment of the present invention.

FIG. 26 is a diagram showing an example of a cycle time determination table 2304 in the second embodiment of the present invention. The cycle time determination table 2304 is referenced by the cycle time determining process 2232, as described previously.

The cycle time determination table 2304 shown in FIG. 26 stores information representing mapping between charging times Tchg and operating cycle times Tb4, when Const=0.2. The cycle time determining process 2232 calculates a charging time Tchg and refers to this cycle time determination table 2304, and determines an operating cycle time Tb4 associated with the charging time Tchg (modifying the operating cycle time at ST2404 in FIG. 24). FIG. 26 shows the example in which normalization is applied such that Tb=Tm when Const=1 and charging time Tchg=1.

In the foregoing description, the operating cycle time determining means determines an operating cycle time Tb, based on the measured charging time Tchg and the cycle time determination table 2304. Not restrictive to this, alternatively, for example, a value of gradient a of the remaining amount of power may be calculated according to equation (6), based on the charging time Tchg, the remaining amount of power from which measurement should start Eth3, and the remaining amount of power at which measurement should terminate Eth4. An operating cycle time Tb may be determined, based on the calculated value of gradient a and the cycle time determination table 704 of FIG. 19.

[Equation 6]

$$a = (Eth4 - Eth3)/T\text{chg} \tag{6}$$

By the operating cycle time determining means described above, a suitable operating cycle time Tb is set based on information (charging time Tchg, here) indicating a change in the electric power stored in the electric power storage unit 512 in a worker node 2110 equipped with the electric power storage unit 512 having an even smaller capacity than in the first embodiment described previously. Thereby, node-to-node communication at a high communication rate is enabled and high-speed distributed information processing can be achieved.

Third Embodiment

In a third embodiment, there is described an example of a distributed information processing facility 300 with the addition of an intensive processing mode in which task processing can be executed at a high speed. This mode is added to the distributed information processing facility 100 of the first embodiment described previously.

In the distributed information processing facility 100 of the first embodiment described previously, each worker node 110 executes processing only during a wakeup period Tw for each operating cycle time Tb which has been set beforehand (see FIG. 6). Such a manner of setting a wakeup period Tw for synchronous operation with any other node is desirable in performing node-to-node communication.

However, from a perspective of execution of task processing, a manner in which, as soon as the remaining amount of power E has become equal to or more than the minimum operating power quantity Eth1, a worker node transits into a wakeup period Tw and executes task processing is more efficient, since task processing can be finished earlier. Thus, in the distributed information processing facility 300 of the third embodiment, the intensive processing mode is added in which task processing can be executed at a high speed.

FIG. 27 is a diagram illustrating an example of operation of a worker node 2810 in the third embodiment of the present invention. A worker node 2810 (see FIG. 28) in the third embodiment of the present invention transits into a wakeup period Tw as soon as the remaining amount of power E has become equal to or more than an operation start power quantity Eth 5 which is a threshold equal to or larger than the minimum operating power quantity Eth1.

In such a case that a worker node is forcibly made to transit into a wakeup period Tw as soon as the remaining amount of power E has reached a predetermined value, it is impossible to set an operating cycle time Tb as in the first and second embodiments described previously. In consequence, the worker node operates asynchronously with any other worker node 2810 and node-to-node communication cannot be performed. However, the worker node 2810 is able to execute a task assigned to it at a high speed. This manner is effectual for distributed information processing in which a single task to be processed is very large and node-to-node communication occurs at a low frequency.

Figure 28:
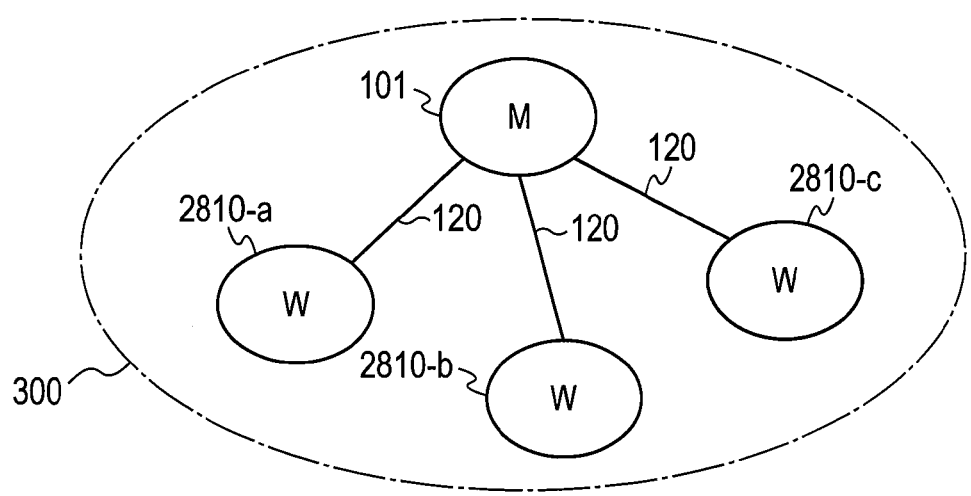
FIG. 28 is a diagram showing an example of overall architecture of a distributed information processing facility of the third embodiment of the present invention.

FIG. 28 is a diagram showing an example of overall architecture of the distributed information processing facility 300 of the third embodiment of the present invention. In the following, components that serve in the same way as those in the previously described first embodiment (see FIG. 1) are assigned the same reference numerals and duplicative descriptions are dispensed with, as appropriate.

In the distributed information processing facility 300 shown in FIG. 28, the configuration and operation of each worker node 2810 differ from those in the distributed information processing facility 100 shown in FIG. 1.

Worker Node Configuration

Figure 29:
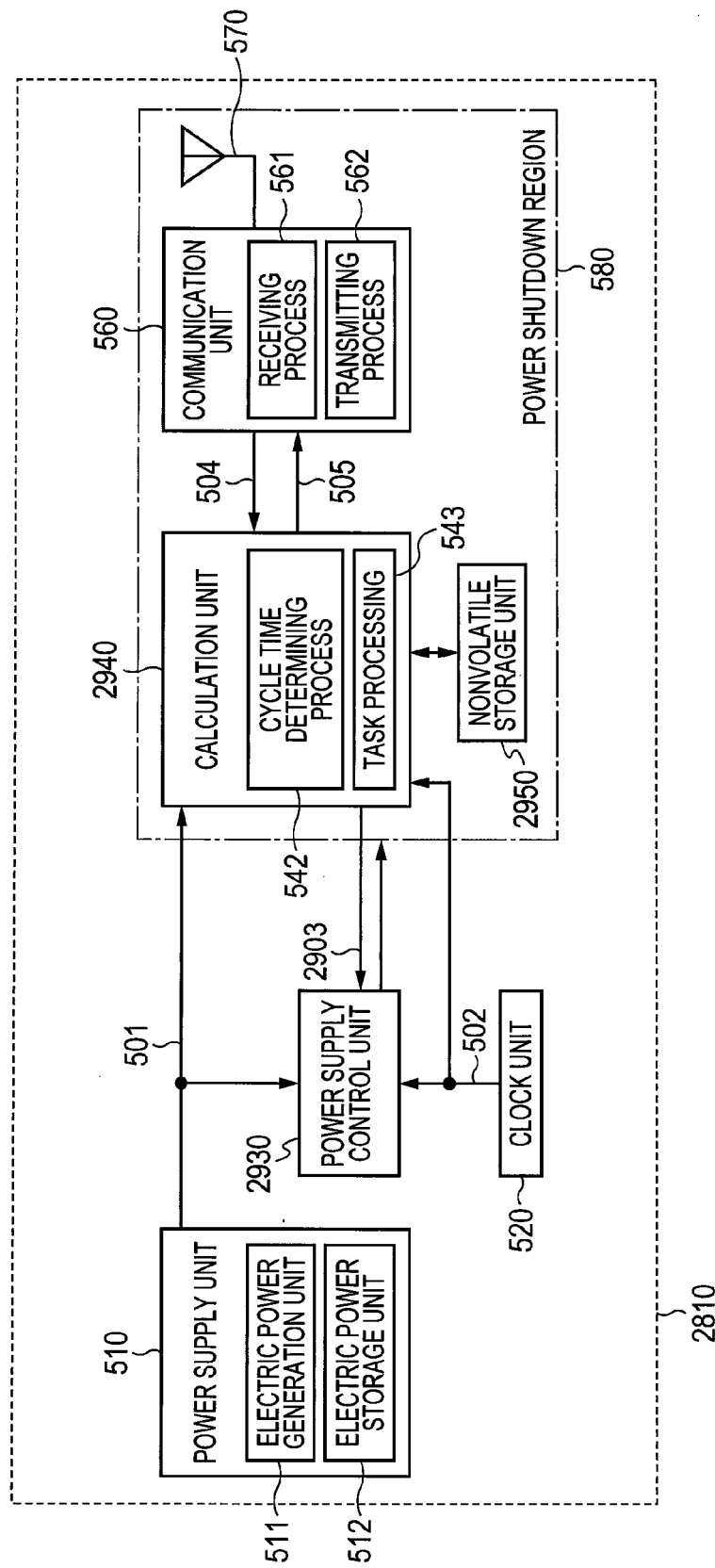
FIG. 29 is a diagram showing an example of a configuration of a worker node in the third embodiment of the present invention.

FIG. 29 is a diagram showing an example of a configuration of a worker node 2810 in the third embodiment of the present invention. In the following, components that serve in the same way as those in the previously described first embodiment (see FIG. 5) are assigned the same reference numerals and duplicative descriptions are dispensed with, as appropriate.

The worker node 2810 includes a power supply unit 510, a clock unit 520, a power supply control unit 2930, calculation unit 2940, a nonvolatile storage unit 2950, a communication unit 560, and an antenna unit 570.

The power supply control unit 2930 includes an intensive processing mode setting register and is a module that performs switching on/off of the power supply to the power shutdown region 580 based on the remaining amount of power information 501, clock time information 502, and control information 2903. The control information 290 is the previously described control information 503 with the addition of intensive processing mode setting information related to setting the intensive processing mode. Unlike the power supply control unit 530 in FIG. 5, this power supply control unit 2930 involves an operation for intensive processing mode, that is, turning on the power supply to the power shutdown region 580 based on the remaining amount of power information 501 and intensive processing mode setting information included in the control information 2903.

The calculation unit 540 is a module for executing a calculation program and is generally configured with a CPU. Unlike the calculation unit 540 in FIG. 5, this calculation unit 2940 sends intensive processing mode setting information to the power supply control unit 2930 and controls the intensive processing mode. This calculation unit 2940 checks an intensive processing mode flag 3009 in the nonvolatile storage unit 2950 each time the worker node is activated and switches over between normal processing mode and intensive operation mode.

The nonvolatile storage unit 2950 is a module that is capable of retaining data even when the power supply is off and it is, for example, ROM, FeRAM, flash memory, or the like. Various sorts of information which are stored in the nonvolatile storage unit 2950 will be described later using FIG. 30.

Figure 30:
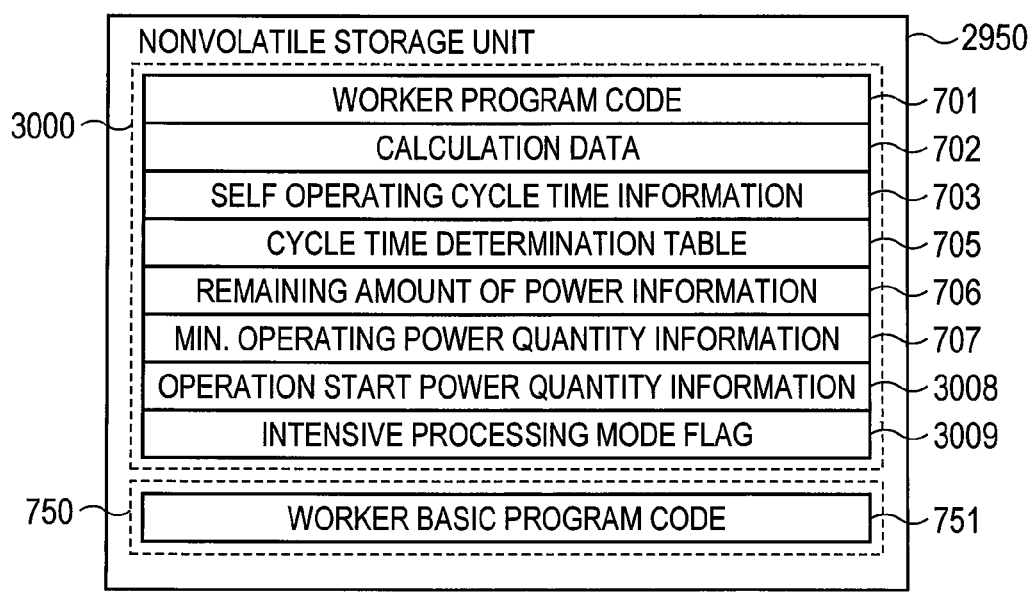
FIG. 30 is a diagram illustrating what information is stored in a nonvolatile storage unit of a worker node in the third embodiment of the present invention.

FIG. 30 is a diagram illustrating what information is stored in the nonvolatile storage unit 2950 of a worker node 2810 in the third embodiment of the present invention. In the following, components that serve in the same way as those in the previously described first embodiment (see FIG. 7) are assigned the same reference numerals and duplicative descriptions are dispensed with, as appropriate.

The nonvolatile storage unit 2950 has a RAM part 3000 and a ROM part 750.

The RAM part 3000 holds operation start power quantity information 3008 and the intensive processing mode flag 3009 unlike the RAM part 700 in FIG. 7.

The operation start power quantity information 3008 indicates a threshold of the remaining amount of power E for the worker node 2810 to start operation (that is, transit into a wakeup period Tw). In particular, this information indicates the operation start power quantity Eth 5 in FIG. 27.

The intensive processing mode flag 3009 is flag information indicating whether intensive processing mode or normal processing mode is active, namely, intensive processing mode setting information. When this intensive processing mode flag 3009 is set on, intensive processing mode is active. Otherwise, when the flag is set off, normal processing mode is active.

Figure 31:
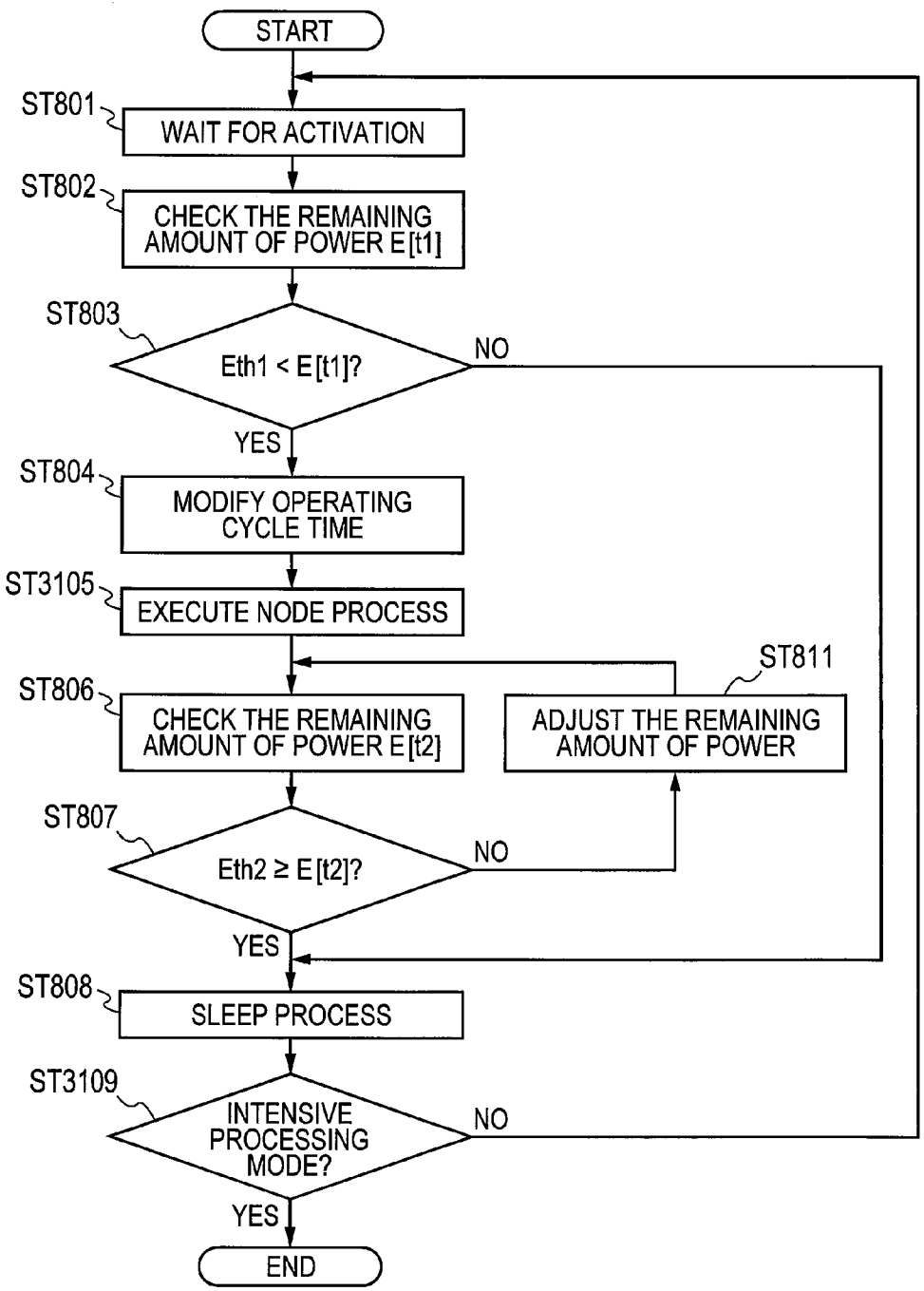
FIG. 31 is a flowchart illustrating an operation in normal processing mode of a worker node in the third embodiment of the present invention.
Figure 32:
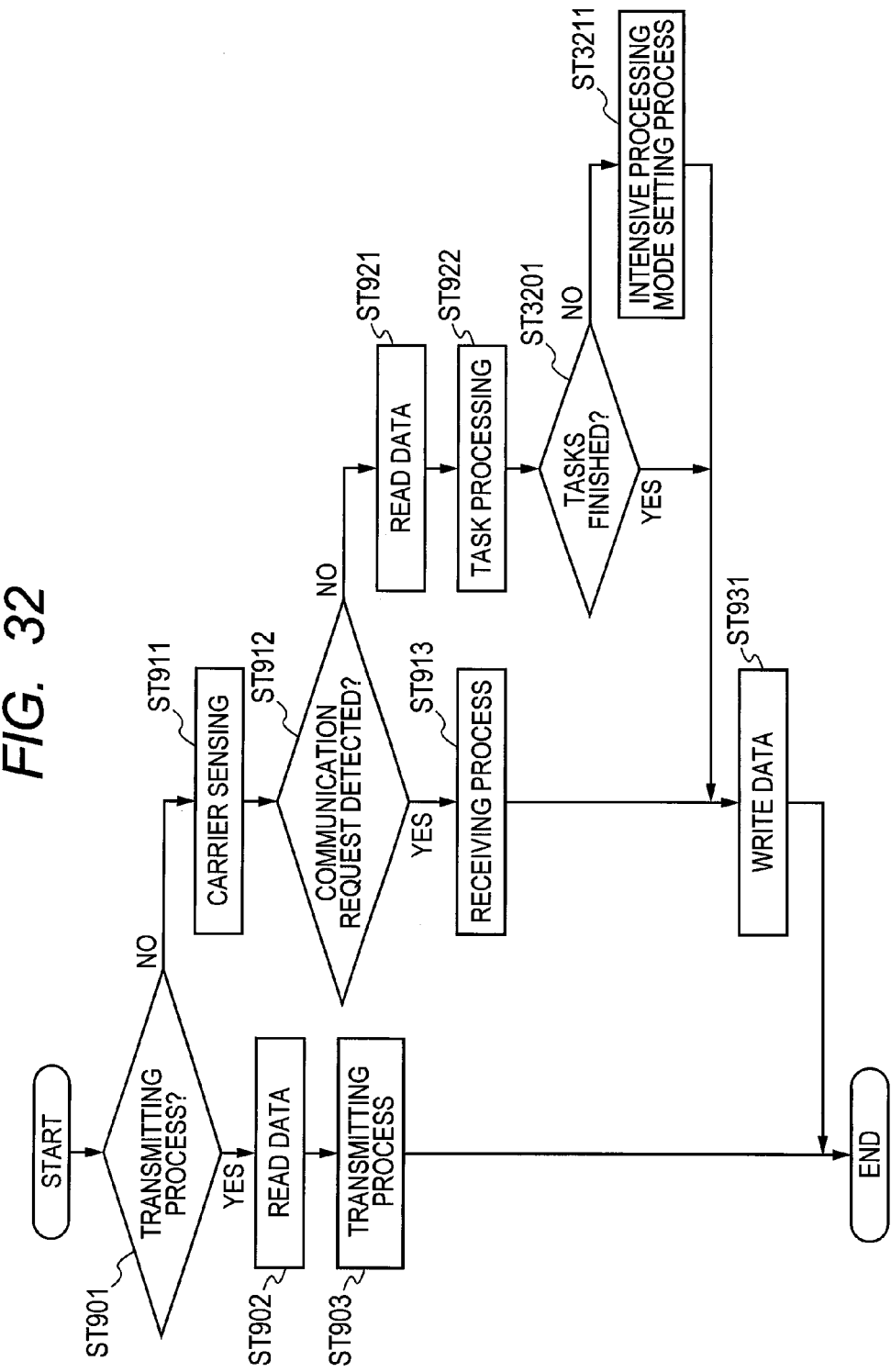
FIG. 32 is a flowchart illustrating a node process in a worker node in normal processing mode in the third embodiment of the present invention.
Figure 33:
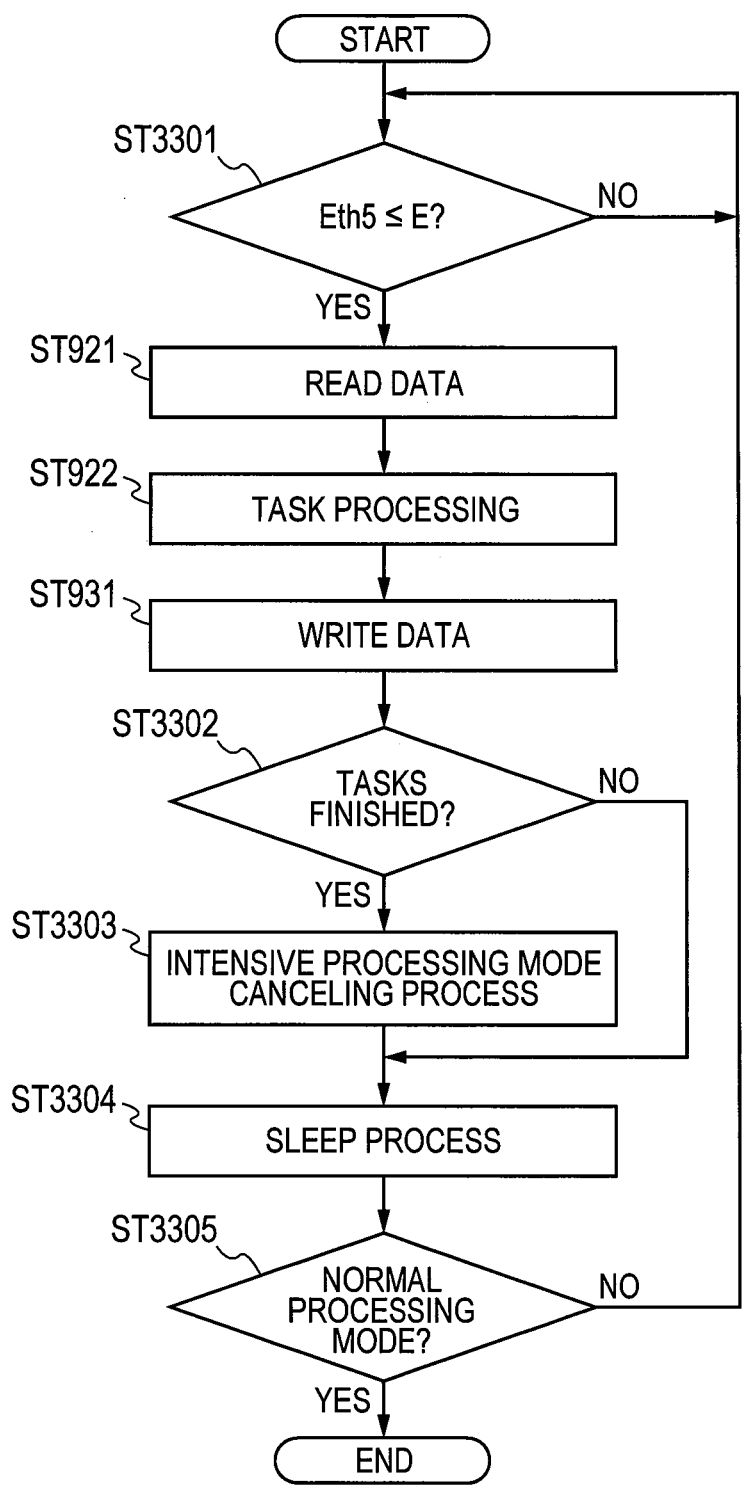
FIG. 33 is a flowchart illustrating an operation in intensive processing mode of a worker node in the third embodiment of the present invention.

Next, operations of a worker node 2810 are described, using FIGS. 31, 32, and 33.

FIG. 31 is a flowchart illustrating an operation in normal processing mode of a worker node 2810 in the third embodiment of the present invention. In the following, components that serve in the same way as those in the previously described first embodiment (see FIG. 8) are assigned the same reference numerals and duplicative descriptions are dispensed with, as appropriate.

The flowchart shown in FIG. 31 differs from the flowchart of FIG. 8 in processing detail of ST3105 (executing a node process) and in that ST3109 (branching depending on whether intensive processing mode is active) is added. These two steps are described below.

At ST3015, the worker node 2810 executes a node process (ST3015). The node process termed herein includes, inter alia, communication processing (the transmitting process 562 and receiving process 561) and task processing 543. The node process will be detailed later, using FIG. 32.

At ST3109, the worker node 2810 decides whether intensive processing mode is active (3109). In particular, at ST3105, the worker node decides whether intensive processing mode has been set. If intensive processing mode is active (Yes, as decided at 3109), the worker node terminates processing in normal processing mode and starts processing in intensive processing mode. Processing in intensive processing mode will be detailed later, using FIG. 33. Otherwise, if intensive processing mode is not active (No, as decided at 3109), the worker node returns to ST801 and repeats processing.

FIG. 32 is a flowchart illustrating a node process in a worker node 2810 in normal processing mode in the third embodiment of the present invention. Here, the node process that is executed at ST3105 in FIG. 31 is described. In the following, components that serve in the same way as those in the previously described first embodiment (see FIG. 9) are assigned the same reference numerals and duplicative descriptions are dispensed with, as appropriate.

The flowchart shown in FIG. 32 differs from the flowchart of FIG. 9 in that ST3201 (checking whether tasks are finished) and ST3211 (intensive processing mode setting process) are added after ST922 (task processing).

At ST3201, the worker node 2810 checks whether processing of all tasks assigned from the master node 101 is finished (ST3201). If processing of all tasks is finished (Yes, as decided at ST3201), the worker node proceeds to ST931. Otherwise, if processing of all tasks is not finished (No, as decided at ST3201), the worker node proceeds to ST3211.

If having proceeded to ST3211, the worker node 2810 sets the worker node 2810 in intensive processing mode (ST3211). In particular, the calculation unit 2940 sends operation start power quantity information 3008 (operation start power quantity Eth5) and a register setting signal for setting the intensive processing mode in the intensive processing mode setting register to the power supply control unit 2930 as intensive processing mode setting information. Besides, it changes the intensive processing mode flag 3009 to on in the nonvolatile storage unit 2950. Thereby, the worker node 2810 will operate in intensive processing mode from next activation timing.

FIG. 33 is a flowchart illustrating an operation in intensive processing mode of a worker node 2810 in the third embodiment of the present invention. In the following, components that serve in the same way as those in the previously described first embodiment (see FIG. 9) are assigned the same reference numerals and duplicative descriptions are dispensed with, as appropriate.

At ST3301, first, the worker node 2810, after acquiring the remaining amount of power information 501, watches the remaining amount of power E and waits until the remaining amount of power E becomes equal to or more than the operation start power quantity Eth5 (ST3301). This ST3301 is executed during a sleep period Ts.

Once the remaining amount of power E has become equal to or more than the operation start power quantity Eth5 (Yes, ad decided at ST3301), the worker node 2810 executes ST921 (reading data), ST922 (task processing), and ST931 (writing data) in order and proceeds to ST3302.

At ST3302, the worker node 2810 checks whether processing of all tasks assigned from the master node 101 is finished (ST3302). If processing of all tasks is finished (Yes, as decided at ST3302), the worker node proceeds to ST3303. Otherwise, if processing of all tasks is not finished (No, as decided at ST3302), the worker node proceeds to ST3304.

If having proceeded to ST3303, the worker node 2810 cancels intensive processing mode and sets normal processing mode (ST3303). In particular, the calculation unit 2940 sends a register setting signal for canceling intensive processing mode (that is, setting normal processing mode) to the power supply control unit 2930. Besides, the calculation unit 2940 changes the intensive processing mode flag 3009 to off in the nonvolatile storage unit 2950. Thereby, the worker node 2810 will operate in normal processing mode from next activation timing.

If having proceeded to ST3304, the worker node 2810 executes a sleep process (ST3304). In particular, the worker node executes a preparation process for entering a sleep period Ts. That is, the calculation unit 2940 sends control information 503 (minimum operating power quantity information 706, self operating cycle time information 703, and operation finished information) to the power supply control unit 2930. Then, the power supply control unit 2930 calculates a next wakeup time, based on the clock time information 502, the self operating cycle time information 703 (i.e., operating cycle time Tb) in the control information 503, and the present wakeup time information set in the wakeup time setting register, if the current time instant is ahead of the present wakeup time setting. The next wakeup time is calculated by a formula: next wakeup time=present wakeup time+operating cycle time Tb. Then, the next wakeup time thus calculated is set in the wakeup time setting register. Following that, the worker node executes a sleep process and proceeds to ST3305 upon the termination of the sleep process.

As described for ST3004, by updating the wakeup time set in the wakeup time setting register, a smooth transition from intensive processing mode which is asynchronous with any other node to normal processing mode which is synchronous with any other node is possible.

Then, at ST3305, the worker node 2810 decides whether normal processing mode is active (3305). In particular, the worker node decides whether intensive processing mode has been canceled at ST3303. If normal processing mode is active (Yes, as decided at ST3305), the worker node terminates processing in intensive processing mode and starts processing in normal processing mode. Processing in normal processing mode is as described previously using FIG. 31. Otherwise, if normal processing mode is not active (No, as decided at ST3305), the worker node returns to ST3301 and repeats the process.

According to the third embodiment described above, by having the intensive processing mode, the distributed information processing facility 300 is capable of carrying out task processing at a higher speed than the distributed information processing facility 100 of the previously described first embodiment.

While the respective embodiments of the present invention have been described, the above-described embodiments are illustrative of an example of application of the present invention and are not intended to limit the technical scope of the present invention to these embodiments. Various changes or modifications are possible without departing from the gist of the invention.

What is claimed is:
1. A computer system comprising:
a plurality of worker nodes, each being equipped with an electric power generation unit and an electric power storage unit storing electric power generated by the electric power generation unit; and a master node responsible for management of tasks that are assigned to the worker nodes, wherein each of the worker nodes determine an operating cycle time of the worker node to execute a task assigned by the master node or communicate with any other worker node, based on information indicating an amount of change per unit time of electric power stored in the electric power storage unit of the worker node, wherein each of the worker nodes are provided with a cycle time determination table mapping between ranges of the amount of change per unit time of electronic power and operating cycle times, the operating cycle time being determined by multiplying a predetermined basic cycle by a power of two, and wherein each of the worker nodes determines the operation cycle time based on the information indicating the amount of change per unit time and the cycle time determination table.

2. The computer system according to claim 1, wherein the operating cycle time consists of a sleep period to store electric power into the electric power storage unit and a wakeup period to execute processing in each the worker node using electric power stored in the electric power storage unit, and wherein each of the worker nodes is provided with a wakeup time setting register in which a start time instant of the wakeup period is set, calculates a start time instant of a next wakeup period, based on the determined operating cycle time and a value set in the wakeup time setting register, and sets the calculated start time instant in the wakeup time setting register.

3. The computer system according to claim 1, wherein the information indicating an amount of change per unit time in electric power is a charging time indicating time taken for charging the electric power storage unit with a predetermined amount of electric power.

4. The computer system according to claim 1, wherein each of the worker nodes have an intensive processing mode for intensively executing tasks assigned by the master node, once electric power stored in the electric power storage unit has become equal to or more than a predetermined amount.

5. The computer system according to claim 4, wherein the operating cycle time consists of a sleep period to store electric power into the electric power storage unit and a wakeup period to execute processing in each the worker node using electric power stored in the electric power storage unit, and wherein each of the worker nodes is provided with an intensive processing mode setting register in which the intensive processing mode is set and a wakeup time setting register in which a start time instant of the wakeup period is set, determines the operating cycle time of the worker node upon calculation of the intensive processing mode set in the intensive processing mode setting register, calculates a start time instant of a next wakeup period, based on the determined operating cycle time and a value set in the wakeup time setting register, and sets the calculated start time instant in the wakeup time setting register.

6. The computer system according to claim 1, wherein the master node is provided with a task assignment table for management of information related to assigning tasks to the worker nodes and determines a task to be assigned to each worker node based on the determined operating cycle time of each worker node and the task assignment table.

7. The computer system according to claim 1, wherein each of the worker nodes controls the electric power stored in the electric power storage unit so that a remaining amount of the electric power remains less than a predetermined amount.

8. A computer in a computer system comprising:

a plurality of computers, each being equipped with an electric power generation unit and an electric power storage unit storing electric power generated by the electric power generation unit; and a master node responsible for management of tasks that are assigned to the computers, wherein the computer determines an operating cycle time of the computer to execute a task assigned by the master node or communicate with any other computer, based on information indicating an amount of change per unit time of electric power stored in the electric power storage unit of the computer, wherein the computer is provided with a cycle time determination table mapping between ranges of the amount of change per unit time of electric power and operating cycle time, the operating cycle time being determined by multiplying a predetermined basic cycle by a power of two, and wherein each of the worker nodes determines the operation cycle time based on the information indicating the amount of change per unit time and the cycle time determination table.

9. The computer according to claim 8, wherein the operating cycle time consists of a sleep period to store electric power into the electric power storage unit and a wakeup period to execute processing in the computer using electric power stored in the electric power storage unit, and wherein the computer is provided with a wakeup time setting register in which a start time instant of the wakeup period is set, calculates a start time instant of a next wakeup period, based on the determined operating cycle time and a value set in the wakeup time setting register, and sets the calculated start time instant in the wakeup time setting register.

10. The computer according to claim 8, wherein the information indicating an amount of change per unit time in electric power is a charging time indicating time taken for charging the electric power storage unit with a predetermined amount of electric power.

11. The computer according to claim 8, wherein the computer has an intensive processing mode for intensively executing tasks assigned by the master node, once electric power stored in the electric power storage unit has become equal to or more than a predetermined amount.

12. The computer according to claim 11, wherein the operating cycle time consists of a sleep period to store electric power into the electric power storage unit and a wakeup period to execute processing in the computer using electric power stored in the electric power storage unit, and wherein the computer is provided with an intensive processing mode setting register in which the intensive processing mode is set and a wakeup time setting register in which a start time instant of the wakeup period is set, determines the operating cycle time of the computer upon calculation of the intensive processing mode set in the intensive processing mode setting register, calculates a start time instant of a next wakeup period, based on the determined operating cycle time and a value set in the wakeup time setting register, and sets the calculated start time instant in the wakeup time setting register.

13. The computer system according to claim 8, wherein each of the worker nodes controls the electric power stored in the electric power storage unit so that a remaining amount of the electric power remains less than a predetermined amount.

\* \* \* \* \*